TYPE COMPOSING APPARATUS
Original Filed March 22. 1965 13 Sheets-Sheet 1
Fig. 1
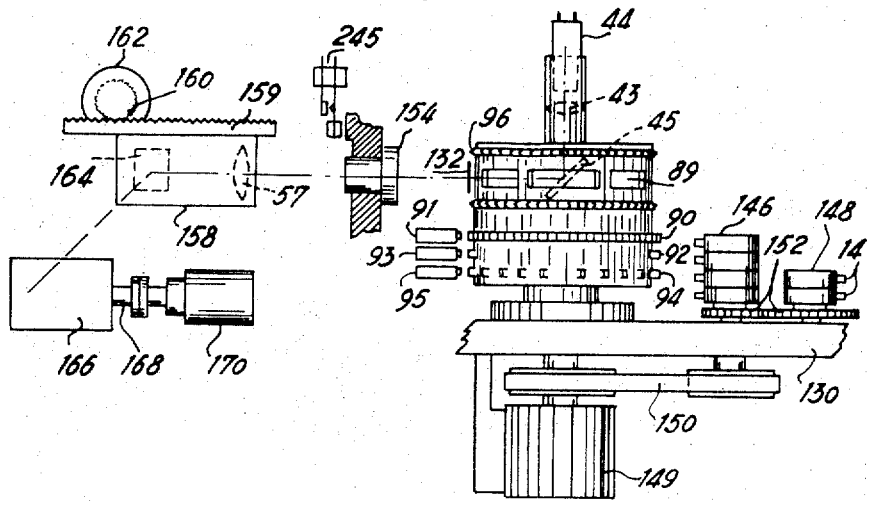
Fig. 15
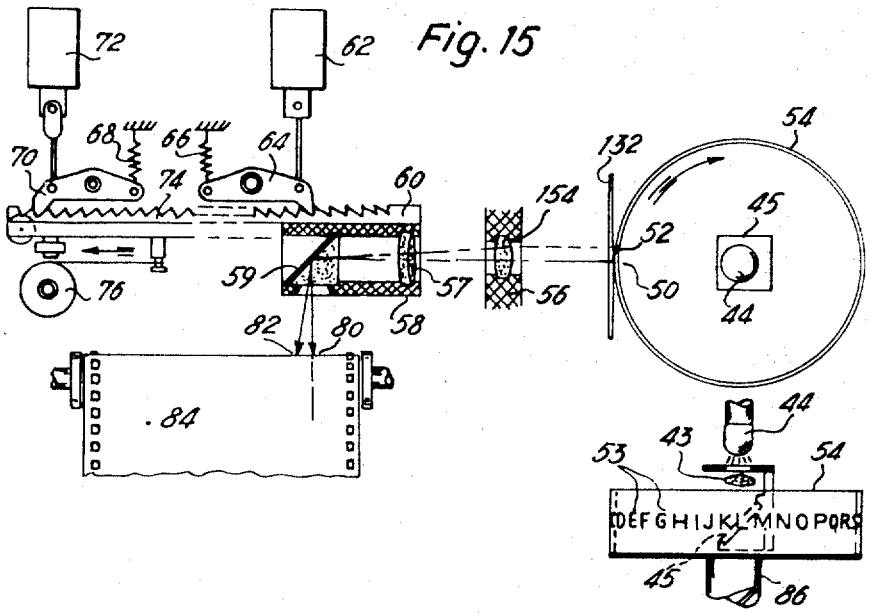
Fig. 2

| RANK | B 32 | C 16 | D 8 | E 4 | F 2 | G 1 | Lower CASE | UPPER CASE | OCTAL |
|---|---|---|---|---|---|---|---|---|---|
| 1 | | | | | | 1 | a | A | 1 |
| 2 | | | | | 2 | | b | B | 2 |
| 3 | | | | | 2 | 1 | c | C | 3 |
| 4 | | | | 4 | | | d | D | 4 |
| 5 | | | | 4 | | 1 | e | E | 5 |
| 6 | | | | 4 | 2 | | f | F | 6 |
| 7 | | | | 4 | 2 | 1 | g | G | 7 |
| 8 | | | 8 | | | | h | H | 10 |
| 9 | | | 8 | | | 1 | i | I | 11 |
| 10 | | | 8 | | 2 | | j | J | 12 |
| 11 | | | 8 | | 2 | 1 | k | K | 13 |
| 12 | | | 8 | 4 | | | l | L | 14 |
| 13 | | | 8 | 4 | | 1 | m | M | 15 |
| 14 | | | 8 | 4 | 2 | | n | N | 16 |
| 15 | | | 8 | 4 | 2 | 1 | o | O | 17 |
| 16 | | 16 | | | | | p | P | 20 |
| 17 | | 16 | | | | 1 | q | Q | 21 |
| 18 | | 16 | | | 2 | | r | R | 22 |
| 19 | | 16 | | | 2 | 1 | s | S | 23 |
| 20 | | 16 | | 4 | | | t | T | 24 |
| 21 | | 16 | | 4 | | 1 | u | U | 25 |
| 22 | | 16 | | 4 | 2 | | v | V | 26 |
| 23 | | 16 | | 4 | 2 | 1 | w | W | 27 |
| 24 | | 16 | 8 | | | | x | X | 30 |
| 25 | | 16 | 8 | | | 1 | y | Y | 31 |
| 26 | | 16 | 8 | | 2 | | z | Z | 32 |
| 27 | | 16 | 8 | | 2 | 1 | PERIOD | 'Quote | 33 |
| 28 | | 16 | 8 | 4 | | | COMMA | ! | 34 |
| 29 | | 16 | 8 | 4 | | 1 | ; | : | 35 |
| 30 | | 16 | 8 | 4 | 2 | | / | VERT \| BAR | 36 |
| 31 | | 16 | 8 | 4 | 2 | 1 | = | + | 37 |

| RANK | B 32 | C 16 | D 8 | E 4 | F 2 | G 1 | Lower CASE | CAPS | OCTAL |
|---|---|---|---|---|---|---|---|---|---|
| 32 | 32 | | | | | | 1 | ? | 40 |
| 33 | 32 | | | | | 1 | 2 | HYPHEN | 41 |
| 34 | 32 | | | | 2 | | 3 | ψ | 42 |
| 35 | 32 | | | | 2 | 1 | 4 | $ | 43 |
| 36 | 32 | | | 4 | | | 5 | % | 44 |
| 37 | 32 | | | 4 | | 1 | 6 | * | 45 |
| 38 | 32 | | | 4 | 2 | | 7 | & | 46 |
| 39 | 32 | | | 4 | 2 | 1 | 8 | UNQUOTE' | 47 |
| 40 | 32 | | 8 | | | | 9 | ( | 50 |
| 41 | 32 | | 8 | | | 1 | 0 | ) | 51 |
| 42 | 32 | | 8 | | 2 | | fl | ffi | 52 |
| 43 | 32 | | 8 | | 2 | 1 | ff | ¢ | 53 |
| 44 | 32 | | 8 | 4 | | | fi | ffl | 54 |
| 45 | 32 | | 8 | 4 | | 1 | ½ DASH | DASH | 55 |

| | | | | | | | | |
|---|---|---|---|---|---|---|---|---|
| 46 | 32 | | 8 | 4 | 2 | | Stop Code | 56 |
| 47 | 32 | | 8 | 4 | 2 | 1 | Flush right | 57 |
| 48 | 32 | 16 | | | | | Justif. Space | 60 |
| 49 | 32 | 16 | | | | 1 | Carriage Ret. | 61 |
| 50 | 32 | 16 | | | 2 | | Cap Shift | 62 |
| 51 | 32 | 16 | | | 2 | 1 | Cap Unshift | 63 |
| 52 | 32 | 16 | | 4 | | | Upper Level | 64 |
| 53 | 32 | 16 | | 4 | | 1 | Lower Level | 65 |
| 54 | 32 | 16 | | 4 | 2 | | Matrix Shift | 66 |
| 55 | 32 | 16 | | 4 | 2 | 1 | Matrix Unshift | 67 |
| 56 | 32 | 16 | 8 | | | | Center | 70 |
| 57 | 32 | 16 | 8 | | | 1 | Flush Left | 71 |
| 58 | 32 | 16 | 8 | | 2 | | EM Space | 72 |
| 59 | 32 | 16 | 8 | | 2 | 1 | EN Space | 73 |
| 60 | 32 | 16 | 8 | 4 | | | Thin Space | 74 |
| 61 | 32 | 16 | 8 | 4 | | 1 | Kill Line | 75 |
| 62 | 32 | 16 | 8 | 4 | 2 | | Functional shift | 76 |
| 63 | 32 | 16 | 8 | 4 | 2 | 1 | Ignore | 77 |

Fig. 26

United States Patent Office

Re. 27,374
Reissued May 16, 1972

27,374
TYPE COMPOSING APPARATUS

Louis M. Moyroud, Delray Beach, Fla., and Rene A. Higonnet, Vaud, Switzerland (both % Photon, Inc., 355 Middlesex Ave., Wilmington, Mass. 01887)

Original No. 3,422,736, dated Jan. 21, 1969, Ser. No. 441,738, Mar. 22, 1965, which is a continuation-in-part of Ser. No. 338,810, Jan. 21, 1964. Application for reissue June 5, 1970, Ser. No. 43,987
Int. Cl. B41b *19/06, 21/26*
U.S. Cl. 95—4.5 20 Claims

Matter enclosed in heavy brackets [ ] appears in the original patent but forms no part of this reissue specification; matter printed in italics indicates the additions made by reissue.

ABSTRACT OF THE DISCLOSURE

This invention relates to a phototypesetter which is used in the graphic arts to produce on photographic film or paper areas of typographic composition. The apparatus described herein comprises a constantly rotating character carrying drum wherein characters are selectively illuminated by a high speed flash tube, an optical projection system a portion of which is adapted for periodic translation in relation to the film and an electronic control circuit which accepts input data, performs a justification calculation and controls the character selection and projection apparatus.

This invention relates generally to photographic type composition apparatus and more particularly to apparatus for projection of characters while in motion with respect to an optical system by means of light flashes of extremely short duration. This is a continuation-in-part of our application Ser. No. 338,810 filed Jan. 21, 1964, now abandoned.

In our Patent No. 2,790,362 we have described a complete photographic type composing machine including a continuously rotating matrix drum and a variable escapement mechanism. A similar, improved machine incorporating a continuously rotating disc is described in our Patent No. 2,999,434. This machine also includes a variable escapement as described in our Patent 2,806,574.

A primary object of the present invention is to provide a photographic type composing apparatus including electronic means to variable space characters images along a line of text matter.

One feature of this invention is the absence of variable escapement mechanism in a machine capable of producing lines of characters of variable widths.

Another feature of the present invention is the provision of means to vary character illumination time in relation to the sum of the widths of previously flashed characters and/or the width of said character.

Other objects of the invention and features not heretofore mentioned will become evident from the description to follow and accompanying drawings in which:

FIG. 1 is a pictorial view in schematic form of the major components of a photographic type composing machine embodying a preferred form of the present invention.

FIG. 2 is a pictorial view of a matrix drum of the machine.

FIG. 15 [on Plate 1] is a view in schematic form of the optical system of one embodiment of the machine.

Figure 16:
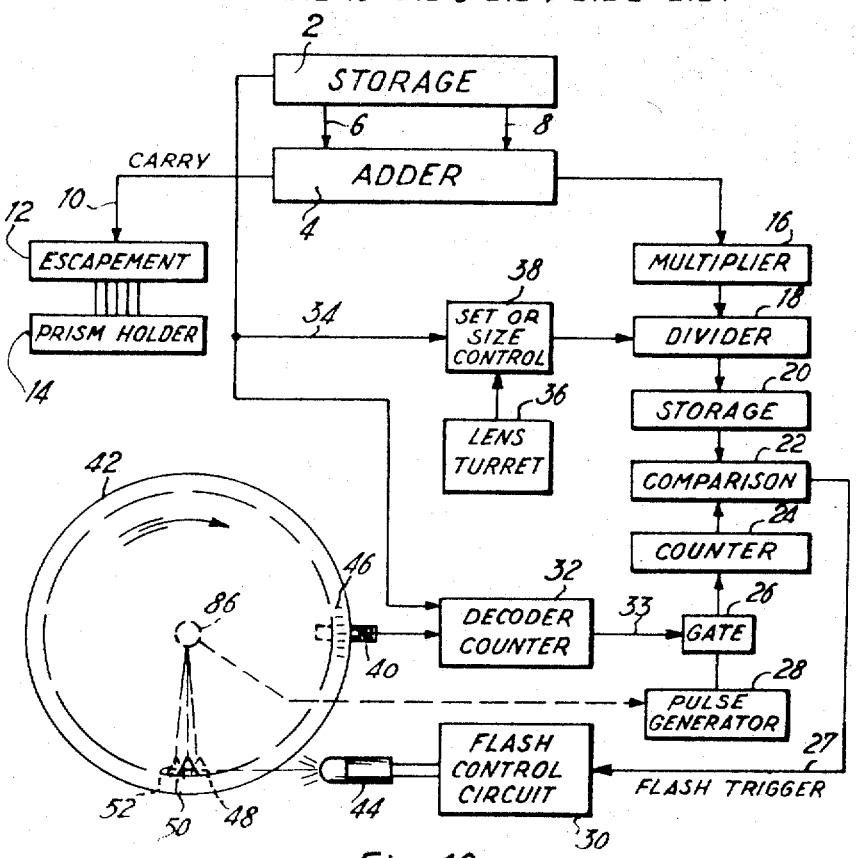

FIG. 16 is a block diagram of a circuit for mixing point sizes in the same line.

Figure 17:
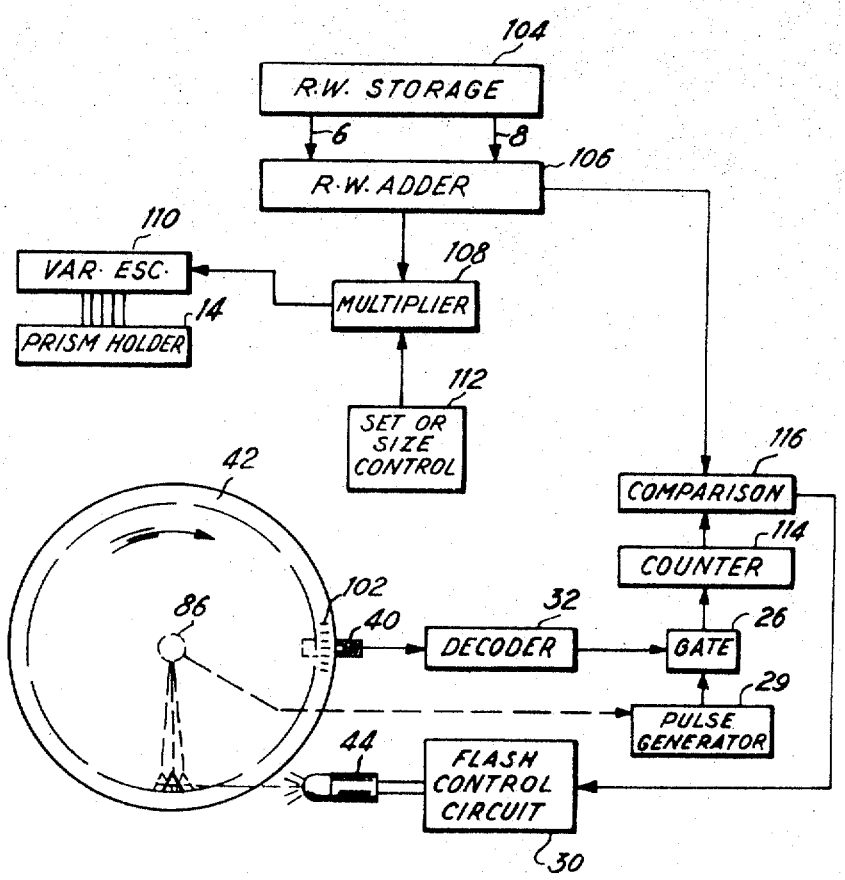

FIG. 17 represents in block diagram form another control circuit for size mixing.

Figure 18:
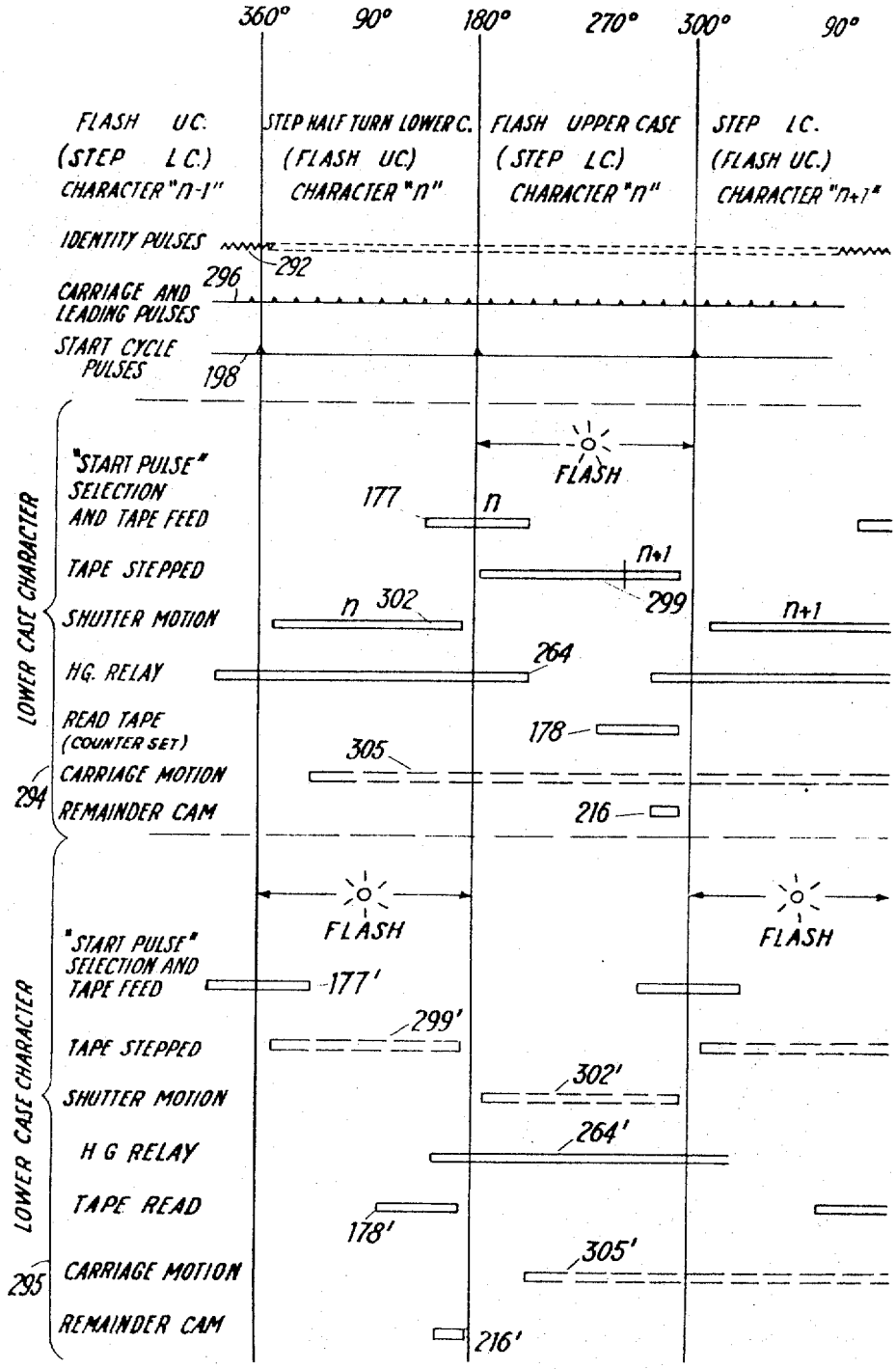

FIG. 18 is a timing diagram.

Figure 19:
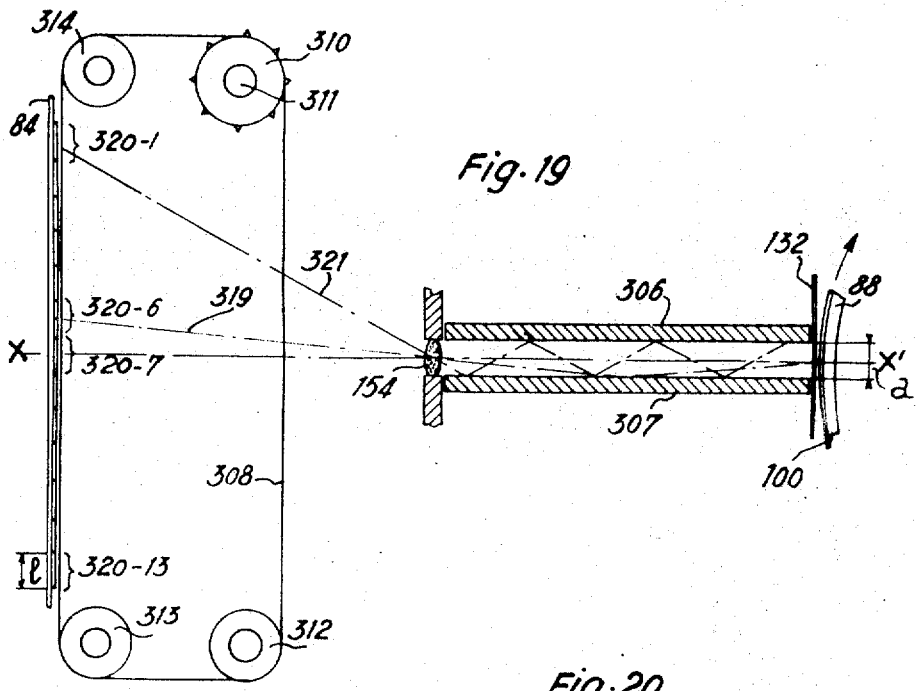
Figure 20:
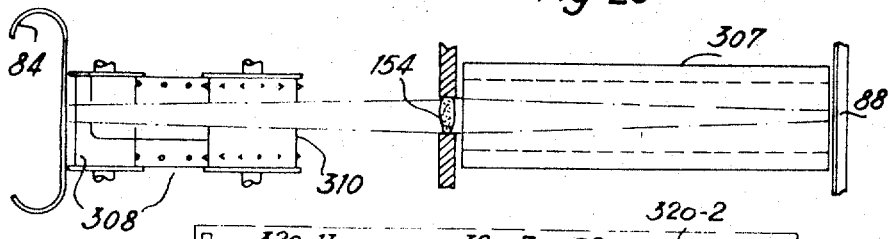

FIGS. 19 and 20 represent the optical system of an alternative with only extremely light moving parts.

Figure 21:
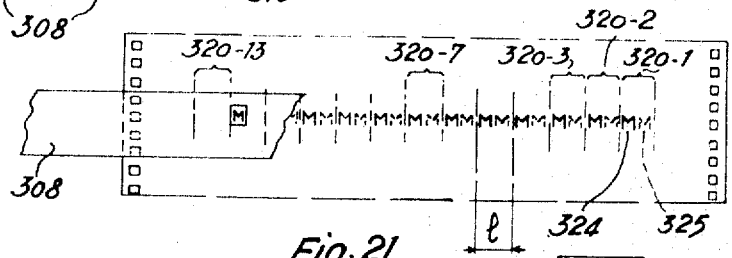

FIG. 21 represents character positions of an embodiment with static projection means.

Figure 22:
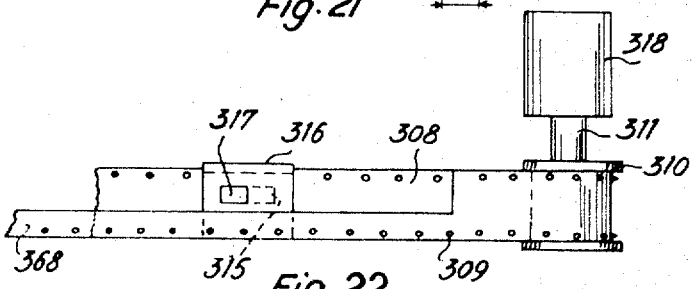

FIG. 22 represents a portion of the static projection system shown in FIG. 19.

Figure 23:
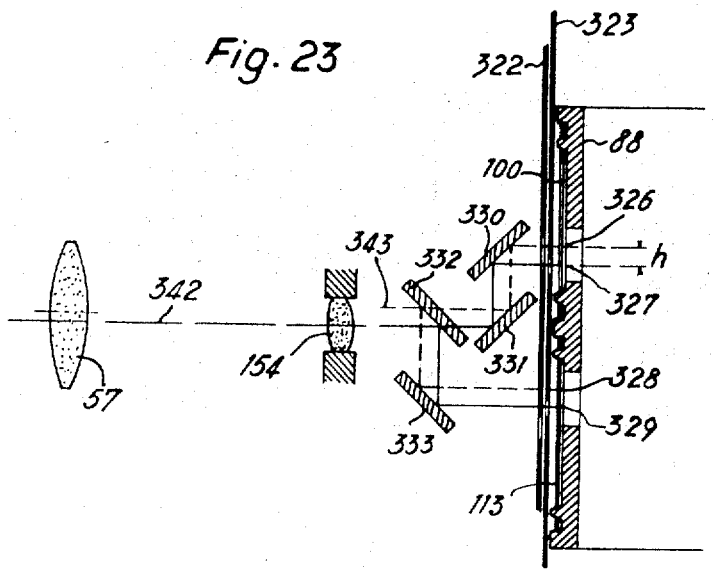

FIG. 23 represents schematically a multiple-font drum with static means for shifting fonts.

Figure 24:
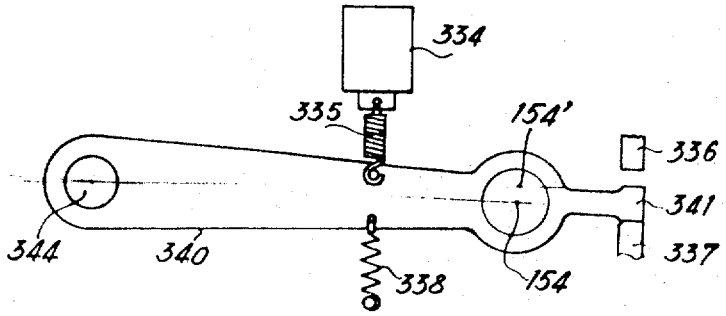

FIG. 24 shows how the projection lens can be displaced to increase the font capacity of the machine.

Figure 25A:
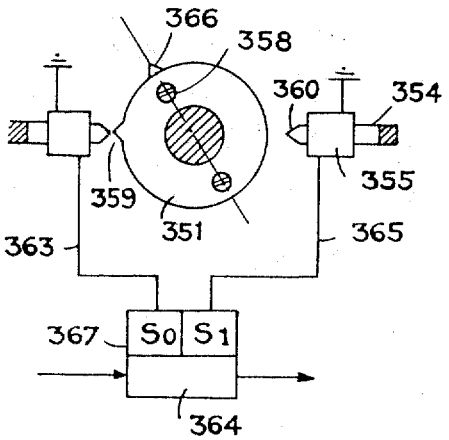

FIG. 25a represents a front view of a sonic cam for generating magnetic pulses.

Figure 25B:
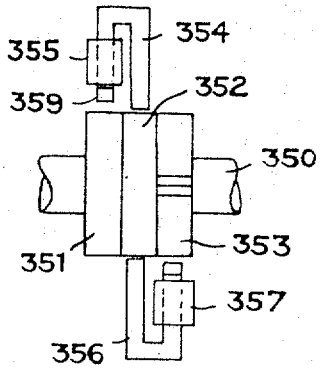

FIG. 25b represents a side view of the cam shown in FIG. 25a.

Figure 25C:
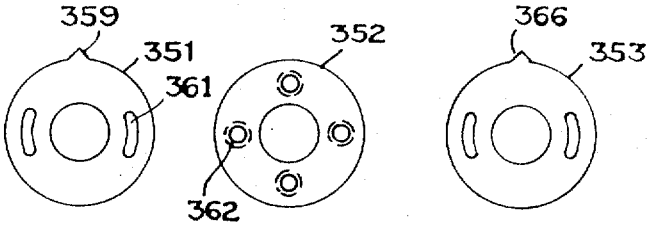

FIG. 25c shows the major components of the cam shown in FIGS. 25a and 25b.

FIG. 26 shows the codes that may be used to control a preferred embodiment of this invention.

Figure 4:
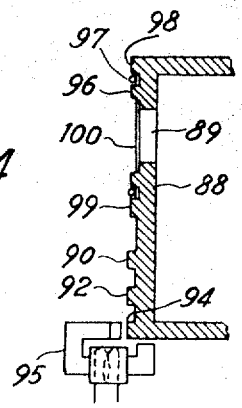
FIG. 4 represents a partial cross-section of a matrix drum.
Figure 5:
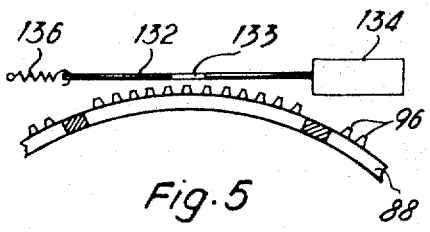
FIG. 5 is a sectional view of a matrix drum with associated window.
Figure 6:
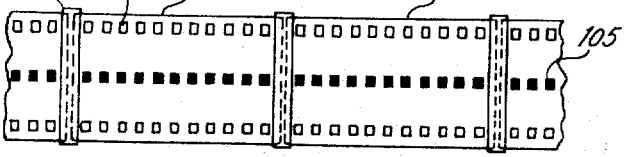
FIG. 6 represents a group of matrix strips.

The major mechanical components of a machine embodying some features of the present invention are shown in FIG. 1. In this figure the master characters, preferably transparent on opaque background, are located on a matrix drum 88, continuously rotated by motor 149, attached to the base 130, of the machine. Selected characters are illuminated for a very short time by a flash lamp 44, associated with a condensing lens 43, and a mirror 45. [An aperture in a shield or window 132,] *a shield 132 having a window therein* allows one character only to be projected to the film during each active cycle of the machine. Characters are projected to a film located in a magazine 166, through a projection lens 154 and a traveling lens 57, associated with a mirror or prism 164, said lens and mirror being part of a sliding carriage 158 which is provided with a rack 159. Said rack is engaged by a gear 160, which can be rotated by a motor 162. In a preferred embodiment of the invention, the master characters are located on a film 100 (see FIG. 6) provided with standard perforations 103. These perforations engage tightly sprocket teeth 96 around the periphery of the drum (see FIGS. 1, 4 and 5), to insure very accurate location of the film the periphery of the drum. In a preferred embodiment of the invention, there is one film perforation and one sprocket tooth for each character. A number of apertures 89, are provided around the drum in order to let light emitted by a flash lamp 44, pass through and reach the character to be projected. Shoulders 98 and 99 shown in FIG. 4, are also provided n drum 88, to insure accurate location of master film strips in the direction parallel to the axis of the matrix drum. To avoid accumulation of errors, the matrix strips are preferably limited in length and carry only a relatively small number of characters as shown in FIGURE 6. In this figure there are only 11 character positions shown at 105, for each fractional matrix strip such as 100 and 101. To facilitate storage, insertion and removal of said strips, they can be connected together by elastic bonding means 107. It is thus possible to keep the various matrix strips together without preventing exact location of individual fractional matrix strips. This arrangement makes it possible to obtain high accuracy in the location of the individual matrix strips regardless of slight dimensional variations due to changes of temperature and humidity and regardless of machining tolerances. A "font strip" is made up of a number (for example 9) of fractional strips in sufficient number to represent a complete lower case and upper case alphabet. The matrix drum, FIG. 1, is also provided with toothed rings 90, 92 and 94. The purpose of these rings is to generate magnetic pulses during the rotation of matrix drum 88. Ring 90 is preferably cut at the same time as film sprockets 96, so that the spacings between two consecutive sprocket teeth is the same as the spacing between two consecutive teeth of ring 90. The purpose of these teeth of ring 90 is to generate one magnetic pulse each time a character of matrix drum 88 cuts a fixed reference point. Ring 92 is provided with two teeth or projections only which are utilized to generate a magnetic pulse each time the character drum starts a new half revolution in relation to said fixed reference point. Ring 94 is provided with a plurality of teeth utilized to generate magnetic pulses to control the carriage and leading motors. Motor 149 is also driving through belt 150, a cam shaft unit 146, rotating at the same speed as the matrix drum and another cam unit 148 rotating at half the speed of the matrix drum. These cams can be made of conductive and insulating segments associated with magnetic pickups 147 and 14, FIG. 1. These brushes can operate fast relays such as mercury wetted contact relays or, directly, the solid state circuits controlling the operation of the machine.

In a preferred alternative, the timing cams of the machine utilize magnetic pulses to open and close electronic gates, as shown in FIG. 25. Each cam unit is preferably made up of a sandwich three iron wafers shown at 351, 352, and 353, FIG. 25C. Wafer 352 is used as a spacer and is provided with a number of tapped holes 362 to receive screws 358. Wafers 351 and 353 are provided with projections such as 359 and 366 which cooperate with magnetic pick-up heads to generate magnetic pulses. The angular relationship between projections or teeth 359 and 366 of the assembled unit can be varied by providing slots 361 in each toothed wafer through which screws 358 are inserted. This angular relationship determines the fraction of the machine cycle during which a cam is "on" or "off." Cooperating with each wafer there is a magnetic pick-up head which can be of the type shown in FIG. 25b. Each head consists of a permanent magnetic schematically shown at 354. One end of this magnetic is located at a very close distance from central wafer 352. The other end, preferably tapered as shown at 360 (FIG. 25a) is located a very close distance from the tip of the corresponding wafer tooth. As the cam unit rotates, the magnetic flux is suddenly increased when a wafer tooth such as 366 reaches a pick-up head tapered end such as 360 and an electric pulse is generated in coil 355. This pulse, after proper amplification and shaping as desired, is sent via wire 365 to input "one" of flip-flop 367. In the same manner, the pick-up head associated with the other wafer 351, of the cam group generates a pulse carried via wire 363 to input "zero" of said flip-flop. An associated gate (which can be part of the flip-flop circuit) is opened between the appearance of an "open" pulse on wire 365 and the appearance of a "close" pulse on wire 363. The advantage of the system described resides in its versatility and reliability as no mechanical friction vibration of wear can affect it.

The film is driven by a motor 170 attached to shaft 168 of the film magazine. The optical system shown in FIG. 1 is similar to the optical system described in Patent No. 2,670,665, in which the matrix is a continuously rotating disc.

Figure 3:
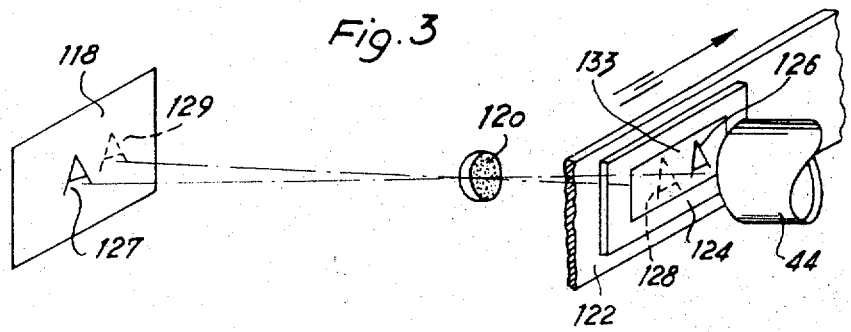
FIG. 3 is a diagram showing how the same character can be projected at different locations on the film by proper flash timing.

One of the principles used in the invention is schematically shown in FIG. 3. In this figure, the continuously rotating drum is shown at 122. The flash lamp is shown adjacent to the drum at 44. A light shield in which an opening or window 133, has been cut is shown at 124. The window width and character spacing on the drum are so determined that no more than one character can be projected through the window at the time the flash lamp is fired. The optical system, in the simplified form shown in the figure consists of a lens 120, properly located to make an image of characters in projection position on a film 118.

As the master drum rotates, any character such as "A" sweeps the width of window [124.] *133*. The window is wide enough to allow a character to be flsahed at different positions at the time it is passing by the area of illumination. For example, in the figure, matrix character "A" can be flashed when it is at position 128 or at position 126. If it is flashed at position 128, its image is made at 129 on the film. If it is flashed at position 126, its image is at 127 on the film. It is clear from this remark that various character spacings on film 118 can be obtained by advancing or delaying the flash of lamp 44 (with reference to an average condition) at the time the selected character goes by the projection window. Assuming line composition is made from right to left on the film (character images upside down), as shown in FIG. 15, a character, for example "1" at the beginning of a line, will be flashed when it is at 50 so that its image will be made adjacent to the left-hand column margin 80. The next character of this line will be flashed when it is at 52 so that its image falls at 82 on the film, distant from 80 by a value appropriate to accommodate the width of the first character "1."

If points 50 and 52 of drum 54, FIG. 15, represent the extreme points [between] *of an aperture or character projection area within* which a character can be projected to the film, it is evident that the distance between these points should not exceed a value which would be detrimental to the quality of the image formed on the film. This distance depends on the diameter of the matrix drum and the point size of the master characters on this drum. It has been found experimentally that a seven-inch diameter drum provided with six point master characters permits a distance between extreme projection points 50 and 52 approximately equal to four 6 point ems. This distance represents roughly seven characters of average width. That means that in the average, carriage 58 of FIG. 15 or 158 of FIG. 1 will be moved only one step for each word. The characters projected while the carriage is stationary are correctly positioned and spaced on film 84, in relation to each other by proper timing of the firing of flash lamp 44.

Various alternatives can be utilized to accomplish character spacing, and preferred embodiments only will be described later. In the case where the photographic type composing machine should produce characters of different sizes from the same matrix, one of the two following methods can be used. In the first method, carriage 58 of FIG. 15 is displaced by one constant step whenever the maximum spacing which can be obtained by selective flash timing has been used up. The frequency of these constant steps varies depending on the point size required. For example, the carriage would in average step once for seven six-point characters and twice for the same characters in 12 point. In the second method the carriage displacement is varied according to the point size used, that is, according to the focal length of projection lens 154 which can be one of several lenses located [of] *in* a lens turret. In this method, assuming for example, that a six-point matrix is used and that the distance between points 50 and 52 corresponds to 7 average characters, the carriage 58 will move by, for example, one-quarter of an inch for the projection of each group of 7 characters of a given point size and by one-half of an inch for the projection of the same group of characters in a double point size. *In the foregoing discussion, the aperture or character projection zone 50–52 is understood to be a relatively wide opening within which a window 133 (which is a relatively small opening in a movable shield 132) may be variably positioned.*

Figure 7:
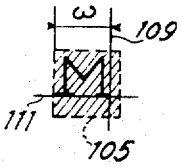
FIG. 7 is a diagram representing the position of a matrix character in a "character area."

In order to increase the angle of rotation of the matrix drum during which a character can be projected at a selected time to produce desired character spacing on the film without having too much space between characters on the matrix, a sliding shield provided with [an aperture or] *a* window is used. This shield is shown at 132 in FIGS. 1, 5, 15 and 8. The shield is located as close as possible to the matrix drum. As is well known in the art, characters used in photographic type composing machines are generally of variable widths and these widths can be measured by an integral number of units or half units. These units can be an exact measurement in fractions of inches or millimeters as described in Patent No. 2,876,687 or they can be relative units or [fratcions] *fractions* of an em, as described in Patent No. 2,682,814. In the latter case, one relative unit depends on the point size utilized. Although both systems of character width measurements can be incorporated in machines embodying the present invention, in one preferred form of this invention we utilize the relative or fraction of an em system. Each character on the matrix strip is exactly located in relation with two reference locating lines, as shown in FIG. 7. In this figure, shaded block 105 represents a "character area" defined as the maximum amount of space which can be allocated to any character of the matrix. Line 111 is the base line on which square serifed characters are sitting and line 109 is the vertical reference line from which any character width is measured. For example, in FIG. 7, the width of "M" is "w" which is generally equal to 18 units. In the description which follows "unit" is used to mean relative units or generally 1/18 of the point size or of an em when EWU means Elementary Width Unit, that is, the width of 1/18 of a one-point wide character or approximately .02 mm. Character areas are shown at 105 in FIG. 6 and it can be seen in this figure that blank spaces of approximately the same width as each character area are left between each area.

Figure 8A:
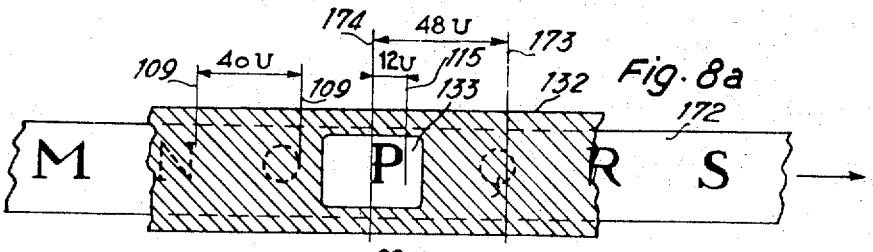
FIGS. 8a–8f represent various positions of the "window" associated with the matrix.
Figure 8B:
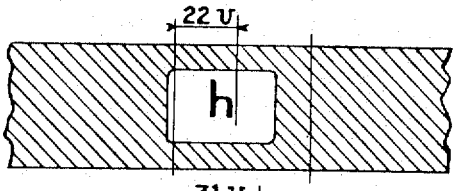
Figure 8C:
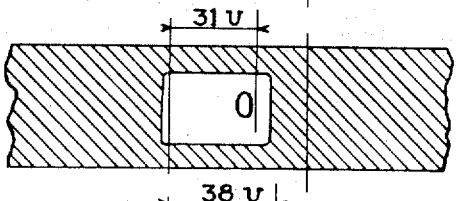
Figure 8D:
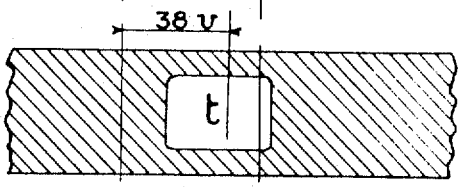
Figure 8E:
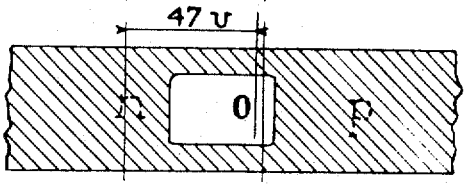
Figure 8F:
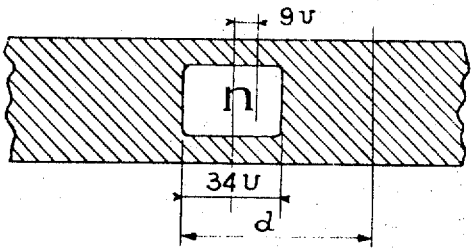

The operation of the sliding shield [or window] will now be described in relation with FIGS. 8a–8f and 13. In FIG. 8 a section of the matrix strip is shown at 172. The drum and the matrix strip it bears are moving in the direction of the arrow. It has been assumed that the matrix characters are arranged in alphabetical order on the strip 172 as shown. If the first word of a line to be composed is "Photon," the characters of this word could be projected in the same order in which they are read. It is assumed that the distance between two vertical reference lines 109 is 40 units as shown in FIG. 8a. In this figure, fixed reference line 174 represents the extreme limit to the left at which the vertical reference line 109 of a character can be located and the character flashed. It is the "early" flash limit. In a similar way a fixed reference line 173 located 48 units in the direction of rotation of the matrix from line 174 defines the "late" flash limit. Any character will be flashed at the time its associated reference line is located within these two limit lines and at no other time. Character spacing by selective flash timing is obtained as will be explained in the following example. In the word "Photon" which is the first word of a line, the characters have the following widths: "P" is 12 units, "h" is 10 units, "o" is 9 units, "t" is 7 units, and "n" is 10 units. The first letter of the word, "P," could be flashed either at the time its associated vertical reference line 115 located at the extreme right of the character registers with line 174 or after it has moved away from line 174 by a distance corresponding to the width of character "P." This last alternative is illustrated in FIG. 8a–8f. FIG. 8a represents the location of matrix character "P" at the [tie] *time* it is flashed. It can be seen in this figure that the right-hand reference line of letter "P" is located 12 units from the "early" flash reference line 174. The 12 units which represent the width of "P" are stored into an electronic character width counter to which is added the width of the next character, which in this case is "h" which is 10 units wide. The counter shows now 22 units (12+10) and caracter "h" will be flashed, as shown in FIG. 8b, at the time its right-hand reference line has moved 22 units from fixed line 174. The next character of the word which is "o" and which measures 9 units, is added to the counter to give an accumulated total of 31 units and this letter "o" will be flashed, as shown in FIG. 8c, when its right hand reference line has moved 31 units from the line 174. In the same way the next character "t," which is 7 units wide will be flashed when its reference line has moved 38 units from line 174 and the following letter "o" will be flashed when its reference line has moved 47 units (38+9) from line 174, as shown in FIG. 8e. Now the last character of the word is added to the counter which registers 47 units to bring up the total to 47+10 or 57 units. But it has been said that the only area in which a character can be flashed is when its vertical reference line is located between lines 174 and 173 which are 48 units apart. Consequently, there is no room between these lines for the last character of the word and the mirror carriage 158 (FIG. 1) is moved one step before this last character can be flashed. This displacement of the carriage is caused by the counter emitting an output pulse whenever it reaches 48 units. This pulse subtracts 48 units from the counter. If it is a binary counter, stages 16 and 32 which represent 48 units are returned to zero. Examination of FIG. 8 shows that if the window 133 were big enough to accommodate a 48 unit displacement of the matrix between extreme projections, adjacent characters would be photographed at the same time as the desired character in certain cases. For example, if [aperture] *window* 133 were expanded as far as line 173, when character "P" is flashed in position shown in FIG. 8a, adjacent character "Q" of the matrix would also be flashed and, in a similar way, FIG. 8e shows that unwanted "n" would be flashed at the same time as desired "o." In order to avoid projecting undesired characters, [window] shield 132 can be moved into various locations, depending on the count stored in the character width counter, as will be explained later. In the example shown, shield 132 can be any of three positions. In position 1, shield 132 is shown in FIGS. 8a and 8f. In this case [aperture] *window* 133 is approximately centered on line 174. Shield 132 is in position 1 when the counter shows an accumulated total less than 16 units. Whenever the accumulated total is in the range 16 (included) to 31 units (included), the shield is in the location shown in FIGS. 8b and 8c. A third position for this shield is shown in FIGS. 8d and 8e. This third position is taken by the shield whenever the counter shows an accumulated total ranging from 32 units to 47 units.

Figure 13:
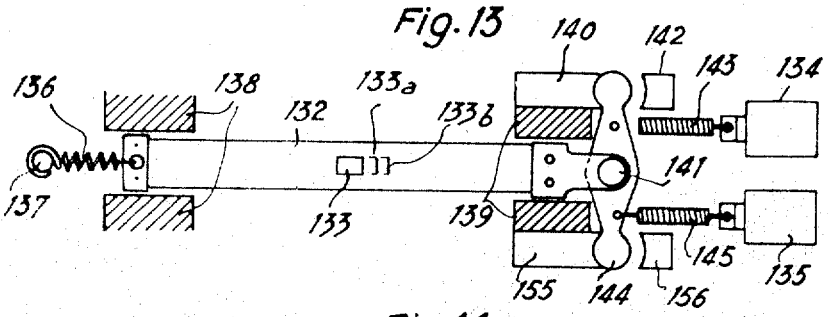
FIG. 13 is a diagrammatic view of the "window" mechanism.

The mechanism used to operate the shield is shown in FIG. 13. The shield is preferably made of a thin metallic strip provided with an [aperture,] *window* 133. The strip can be reinforced at both ends by hardened steel projections. One end of the shield is attached through return spring 136, to fixed stud 137. The shield 132 can slide freely between guides 138 and 139 attached to the frame of the machine. The other end of the shield is attached at 141 on a lever 144. Both ends of this lever are sitting on fixed stops 140 and 155. The upper part of the lever 144 is attached to a spring-link 143, which can be pulled by the plunger or solenoid 134. In a similar manner the lower part of the lever 144 is attached to spring 145 operated by solenoid 135. When solenoid 134 is operated the upper part of the lever 144 is pulled against stop 142, thus moving the window 133 to position 133a distant from original position 133 by 16 units. When solenoid 135 is operated in addition to solenoid 134 the lower part of lever 144 is pulled against stop 156 thus moving the window 133 to position 133b, distant from the original window position 133 by 32 units. Solenoid 134 is controlled by stages 16, 32 and 64 of the binary counter and solenoid 135 is controlled by stages 32 and 64 of said counter.

Figure 10:
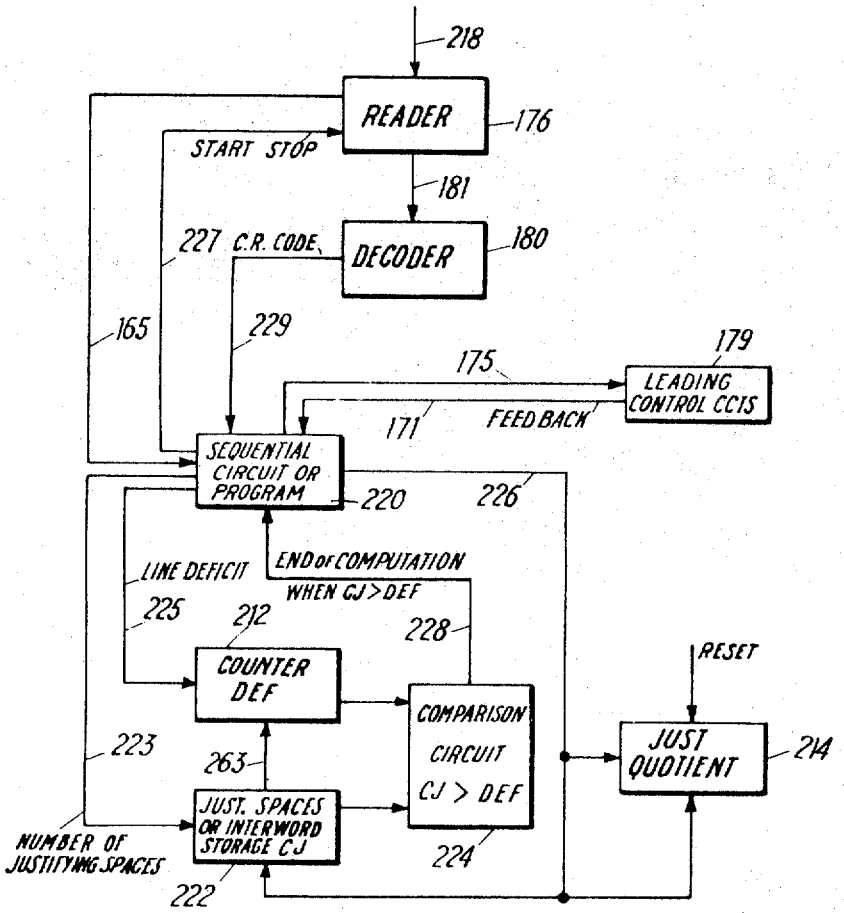
FIG. 10 is a logic diagram illustrating the justification computation.
Figure 9:
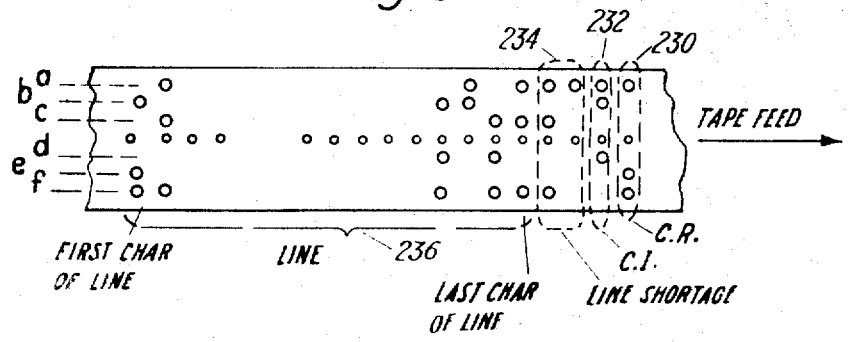
FIG. 9 shows a section of a perforated tape which can be used to control the machine.

The machine incorporating the present invention can be controlled by a punched paper tape. A preferred embodiment of such a machine will now be described. A six-level paper tape, can be produced in a tape-perforating typewriter in a manner well known in the art. Such a tape is schematically shown in FIG. 9. In this example, any character is represented by a six-bit binary code having values 1 to 32. For example, a level a has value 1, level b has value 2, level c has value 4 and so on. The first letter of the alphabet "a" can be represented by one perforation on a level a, letter "b" by one perforation on level b, letter "c" by a perforation on level a and b, letter "d" by one perforation on level c, and so on. In this fashion each character is represented by a number from 1 to 26 for lower case letters from 27 to 37 for figures and so on. The selection between upper case and lower case is obtained by a "shift code" as is well known in the art. The various character codes are shown in Tables I and II. Table II shows more specifically special codes and shift codes such as the justifying or interword code, the carriage return code and shift codes, which cause the matrix drum to be moved along its axes, for example, in the case where different type faces are located around the periphery of the matrix drum as described in Patent No. 2,790,362. They are also provided special codes for fixed blank spaces and various types of quadding. In addition to these codes, there is provided a special "functional shift" code which changes the meaning of any following or preceding code. For example, a functional shift code followed by a figure 4 code will cause 4 units of additional leading to occur. The purpose of the functional shift code is to increase the number of functions which can be controlled by a six-level tape. Another code which affects following codes (at the reading stage) is the carriage return code or any other line termination code, such as center and flush left codes. As shown in FIG. 9 three groups of codes following the carriage return code (when read), have the following meaning: group 232 represents the number of justifying spaces; group 234, using two columns of the punched paper tape represents in relative units, the total amount of space by which the line must be expanded for justification purposes or line deficit. In the preferred embodiment of the present invention, the tape is fed through the photographic unit in the reverse direction from which it was punched as shown by the arrow. In this case, the first code read is the carriage return code CR represented by group 230 which causes a number of events to occur in the machine as will be explained later and also conditions a circuit to accept the next three columns of codes not as ordinary character codes, but as number of interword spaces and line deficit. This can be obtained by a shift relay operated by the carriage return code 230 which stays locked until certain functions such as justification computation have been accomplished and until the paper tape has moved three steps following the reading of the CR or carriage-return code. In FIG. 10 the paper tape has been shown schematically at 218 and the tape reader at 176. As the paper tape is moved through the reader step by step, in the reversed direction from which it was punched, the succeeding codes are transferred through wires 181 to decoder 180. When the carriage return code is recognized by said decoder, a pulse appears on wire 229 which triggers a sequential circuit which, through realys or otherwise, causes the reader to move the tape three more steps in order to transfer the number of justifying spaces C.I. to storage 222 via wire 223 and line deficit DEF to counter 212 via wire 225. As soon as this transfer has taken place, the sequential circuit causes the number of interword spaces to be subtracted from counter 212 via wires 263 as many times as is necessary to decrease the count stored in counter 212 until it is inferior to the figure stored in storage 222. Comparison circuit 224 continuously compares the value of storage 222 and counter 212 and generates a pulse on wire 228 as soon as the value in the counter is inferior to the number of interword spaces. Each time a number equal to the number of interword spaces stored in 222 is subtracted from counter 212, an impulse is sent via wire 226 to a quotient storage 214. In this manner at the end of the justification computation which is detected by the appearance of the carry pulse on wire 228 the quotient of the division of the line deficit by the number of interword spaces is available in storage 214 and the remainder of said division is left in the counter 212. During the justification computation the sequential circuit 220 also energizes through wires 175 the leading or line spacing mechanism 179. When the justification computation and the leading operation have taken place the sequential circuit moves the tape reader to start the actual projection of the characters of the line for which justification has just been computed. However, this does not happen before a feedback signal appears on wire 171 to inform the sequential circuit that the leading operation is complete. The justification computation, although done by electronic means, is similar to the one described in Patent No. 2,682,814.

Figure 11:
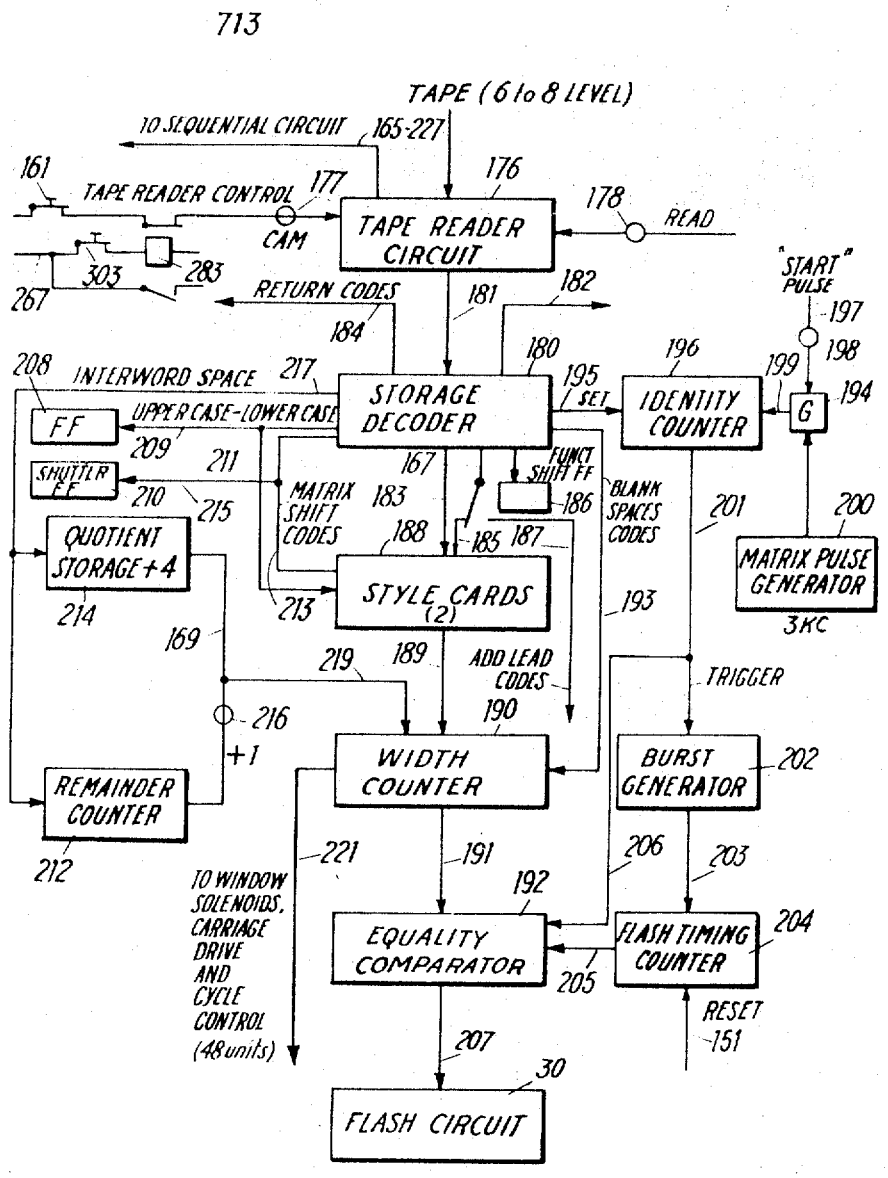
FIG. 11 represents in the form of a block diagram the major circuit components used to project a line of characters and how they are interconnected.
Figure 12:
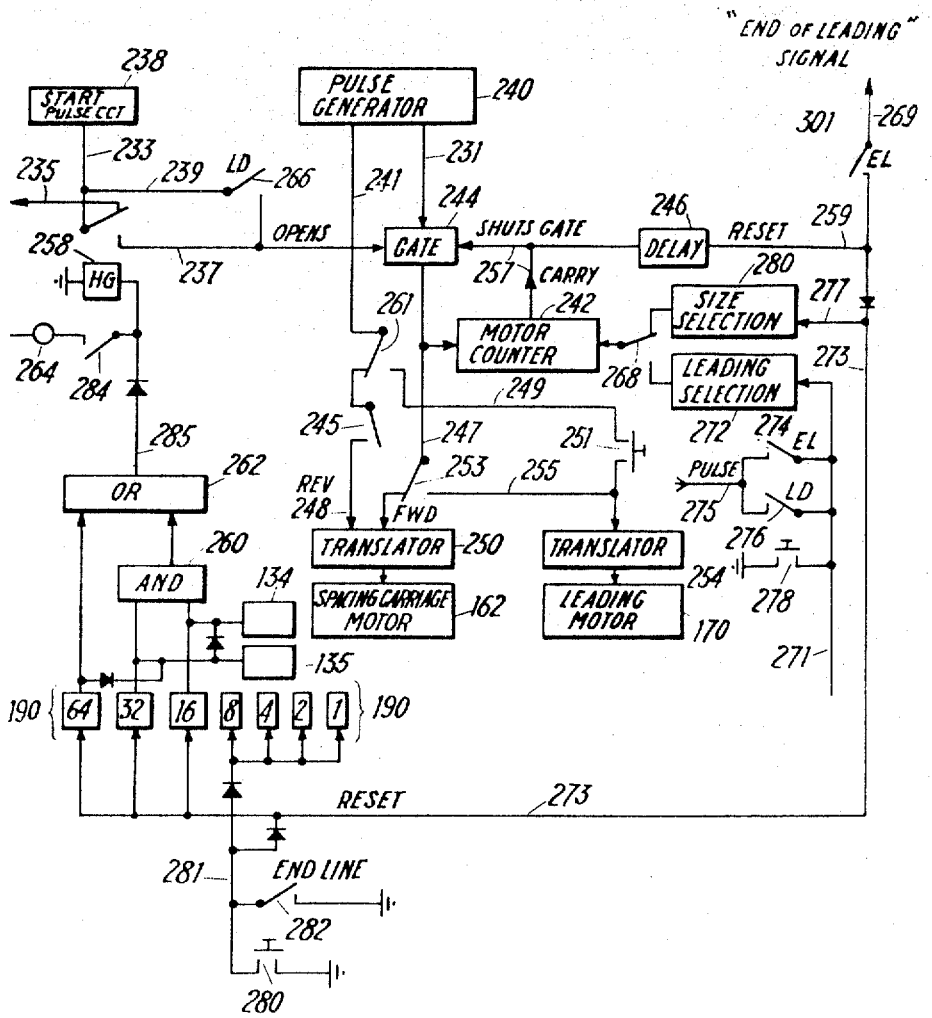
FIG. 12 is a block diagram representing other components of the machine and how they operate.

The block diagram of FIGURE 11 represents the sequence of operations occurring during the projection of a line of characters. As in FIGURE 10, block 176 represents a tape reader, block 180 a decoder, block 214 the quotient storage and block 212 the remainder of the division of the line deficit by the number of justifying spaces. The operation of the tape reader is controlled by a manual switch 161, and a cam 177. The reading of tape codes is controlled by cam 178. Codes are transferred through wires 181 to the decoder 180 from which emerge a group of wires 183. In the example shown, there are 46 wires in group 183, that is, one wire for each character key of the tape punching keyboard. Style cards and binary coding means as described in Patent No. 3,332,617 are in block 188. The purpose of these style cards is to give to each character represented by a wire of group 183 a relative width expressed in units and preferably in binary form. These widths are transferred via wires 189 to which counter 190. This is preferably a 7-stage binary counter. In a preferred embodiment of the invention, the characters are divided into a lower case group and an upper case group each group occupying one-half of the periphery of the drum. The selection of one-half or the other half of a drum revolution to project a character is obtained by flip-flop 208 controlled by pair of wires 209. The upper and lower case selection also causes a style card shift via wires 211. This style shift can be obtained, for example, by a relay having an appropriate number of transfer contacts, or by a combination of relays and diodes or by means of a magnetic core switching such as described in our British Patent 1,041,053. The six binary codes representing character identity are transferred via wires 195 from decoder 180 to identity counter 196. With the character codes shown in FIG. 26, any value in binary form between 1 and 45 can be transferred to identity counter 196. Assuming now that the first character of a line is an upper case letter, such as "P," a "start" pulse, generated by magnetic reading head 93 of FIG. 1 is sent via wire 197 through timing cam 198 to a gating circuit 194. As soon as gate 194 is open, pulses generated by magnetic reading head 91 of FIG. 1 and circuit 200 are sent via wire 199 to identity counter 196 which counts down one unit for each incoming pulse. Going back to the example mentioned, if "P" is the first character to project, its code (Table I) representing 16 in binary digits has been stored in counter 196 before the first character of the upper case alphabet reaches the projection window. The count will go down to 15 after receiving the first pulse from wire 199 and will finally reach zero for pulse number 16. This means that at this time 15 characters of the matrix have gone by the projection window and the "early" vertical reference line 174 of FIG. 8. Identity counter 196 reaches zero at the exact moment when, in the example shown, the vertical right hand reference line 115 of "P" (FIG. 8) coincides with reference line 174. The return to zero of counter 196 generates a signal on wire 201 which triggers a pulse generator 202. This generator can be a commercially available oscillator as sufficient accuracy is achieved by driving the matrix drum with a constant speed motor. Wire 203 which receives the pulses of pulse generator 202 is connected to the flash timing counter 204, which has been reset to zero by wire 151 after the end of each line and the projection of the preceding character, if any. This counter which was at zero is now receiving pulses from wire 203 at a relatively fast rate and its count is continuously compared via wires 205 to an equality comparator 192. This comparator is also connected via wire 191 with width counter 190. As soon as the count appearing in counter 204 is equal to the count stored in counter 190 the equality comparator 192 emits a pulse which is transferred via wire 207 to the flash control circuit, to trigger the flash lamp and project the character represented by the code of the identity counter. In the example mentioned above where "P" would be the first letter in a line, and assuming this letter is 12 units wide, 12 pulses will be accumulated in the counter 204 before equality is detected by comparator 192 and the flash triggered, which means that the matrix drum will be allowed to rotate by the value corresponding to 12 relative units after the reference line of "P" has crossed the fixed "early" reference line before a flash command is generated. The width counter 190 is also shown in FIG. 12 in the form of binary blocks 1, 2, 4, 8, 16, 32 and 64. As stated before, as soon as the capacity of this counter reaches or exceeds 48 units it generates a signal transferred via wire 221 (FIG. 11) to the carriage displacement control circuit which also causes stages 16 and 32 or 64 to be reset at zero, via wire 273 as shown in FIG. 12. Turning back now to FIG. 11, the width of the next character of the line will be transferred to width counter 190 and added to the previous count stored in this counter. If this next character is a 10 unit wide "h," ten will be added to the 12 units representing the width of "P" which has just been flashed, raising the total count to 22. In this particular case, as "h" is a lower case character, and "P" was an upper case character, a shift code is read between "P" and "h" which causes flip-flop 208 to operate and gate 194 to open at the "start" pulse occurring at the beginning of the passage of the lower case alphabet in projection position. If the word to compose is "Photon" as described above in relation with FIG. 8, the width counter 190 will add up successively the width of "P" plus "h" plus "o" plus "t" plus "o." This counter will emit a signal to cause a displacement of the mirror carriage and reset stages 16 and 32 when the width of the last character, "n" is added as the total count would be 47+10 or 57. The difference between the last count (57) and 48 is left in the counter. The width of the next character or space is added to this remainder. Fixed spaces widths are added to the counter through wires 193. Although these spaces do not cause any flash, they modify the flash timing of following characters. Interwords or justifying codes are transferred from decoder 180 via wire 217 to the quotient storage 214 and the remainder counter 212. Preferably the quotient storage represents the quotient plus four units rather than the quotient alone to insure a minimum interword space, as is common practice in the art. For each justifying space a number of units, as determined by quotient storage 214 are sent via wires 169 and 219 to width counter 190 in the same manner as a character width. In addition the interword space code of wire 217 causes counter 212 to store one unit and to transfer one additional unit to width counter 190. This unit can be added to the quotient in an adder or entered into width counter 190 a very short time after the quotient has been entered, via a cam 216. As soon as remainder counter reaches full capacity, the additional one unit is no longer transmitted to the width counter 190, as at this time the justification remainder has been exhausted. The justification system operates in a manner similar to the one described in Patent No. 2,682,814.

In the case where the matrix drum is provided with different fonts of type, a number of style cards equal to the number of fonts is placed in block 188 and the selection of one style card out of the group of cards is obtained by codes appearing on wires 213. Return codes which cause a justification computation to occur are transferred via wires 184 to the sequential circuit of FIG. 10 and such codes as "kill-line" which cause a full line to be passed by the tape reader without actual projection of characters are transferred to a control circuit by wire 182. A functional shift relay 186 transfers the group of codes appearing on wires 167 from wires 185 leading to decoder 180 to wires 187. This relay is energized for certain functions such as, for example, additional leading in which character codes preceded by a "functional shift" code are utilized to move the film up for line spacing by various amounts. In the case where the width counter 190 is at zero during the composition of a line, as would happen occasionally when the addition of a character width brings such counter at exactly 48 units resulting in an output signal and a complete return to zero of said counter, the equality comparator 192 detects the presence of zero in width counter 190 and utilizes the output pulse of identity counter 196 transferred via wire 206 to generate a pulse and trigger the flash circuit at the exact moment when the vertical reference line of the character to flash coincides with the "early" reference line.

Figure 14:
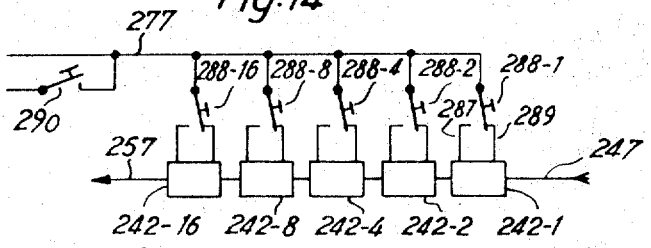
FIG. 14 represents a group of push buttons for machine control.

In the preferred embodiment of the invention now being described, it is assumed that mirror carriage 158 is periodically moved along the optical axis of lens 154 by a unit which is constant for a given point size, but which varies according to the focal length of lens 154, that is, with the point size selected. It is assumed here that the machine described in this first embodiment will not permit mixing sizes in the same line in a fully automatic fashion. The displacement of carriage 158 is controlled by a motor 162 which can be a commercially available synchronous motor known as "stepping motor." The increment by which this motor moves mirror carriage 158 can be varied according to the point size selected by a manner which will be described in relation with FIG. 12. This figure represents the control of mirror carriage 158 and also the control of leading or film feed which is also obtained by the use of a stepping motor 170. The control of both motors is achieved by a binary counter 242 are shown at 242–1, 242–2 . . . 242– counter as the identity counter 196 of FIG. 11, this time sharing is possible because counter 242 is not used when counter 196 is used, and vice versa. Box 280 represents a group of push buttons such as shown in FIGURE 14 for point size selection. In this figure the different stages of binary counter 242 are shown at 242–1; 242–2 . . . 242–16. Each stage of this counter can be set at "one" or "zero" via wire 277 and push buttons 288–1, 288–2 . . . 288–16. Wires such as 289 set the corresponding binary stage at zero and wires such as 287 set the same stage at one. These wires are selected by associated push buttons as shown. Thus, by pushing a proper selection of buttons, it is possible to prefill counter 242 to any value between zero and its full capacity; 32. Push buttons 288 are preferably of the self-locking type. A manual key 290 can be provided for manually setting the counter. Returning now to FIG. 12, a pulse generator is shown at 240 which is controlled by magnetic head 95 of FIG. 1. This pulse generator 240 is continuously generating pulses which have no effect on counter 242 unless a gate 244 is open. It is assumed now that stepping motor 162 can operate at a sufficiently high speed to cause a fast displacement of carriage 158. As said before, carriage 158 will move occasionally by one step under the control of motor 162, said step being the same until lens 154 is changed and point size selection push buttons 280, FIG. 12, have been reset to a new value. It has been found convenient to make one step of carriage 158 equal to six incremental steps of motor 162 for six-point type; 7 incremental steps of motor 162 for seven-point type; . . . 12 incremental steps of motor 162 for 12-point type, etc. One incremental step of the motor is equal to 48 times the value of a one-point relative unit. This is approximately equal to one millimeter. Consequently if a 10-point line is projected each step of carriage 158 will equal 10 mm. Counter 242 is preset at a value equal to its capacity that is, for example, 32 units, minus the point size desired. If the line has to be set in 10 points, the counter will be preset at a value equal to 32 minus 10 or 22 units. In this case counter 242 will be able to accept 10 pulses, that is a number of pulses equal to the point size desired, before it emits a signal on wire 257.

Character width counter 190 operates relay 258, via wire 285 through "AND" circuit 260 and "OR" circuit 262. Circuit 260 emits a signal whenever the counter 190 reaches 48 units. In the case where said counter reaches 64 units, a signal is directly transmitted by stage 64 through "OR" circuit 262 to relay 258. The energization of relay 258 causes a contact 284 to operate which locks relay 258 on a cam 264. This causes the machine to lose one revolution, that is the matrix drum is allowed to make a full turn during which no character is flashed and the punched paper tape is not stepped. The purpose of this one-turn delay is to allow sufficient time for mirror carriage 158 to step by the amount required by the point size selected. Energization of relays 258 also causes the "start" pulse circuit 238 to be disconnected from wire 235 which controls the beginning of the counting operation in normal cases and connected to wire 237 to open gate 244. As soon as gate 244 is open, pulses appearing on wire 231 go through this gate to counter 242 and also via wire 247 and transfer contact 253 to the carriage motor 162 through translator 250. The purpose of this translator is to feed into the motor pulses of appropriate shape, polarity and duration to operate stepping motor 162. Counter 242 is now filling up and when full capacity is reached, it transfers a carry pulse or signal to wire 257, to shut gate 244, and through delay 246, wire 259, wire 257, size selection switches 280 and contact 268, the signal resets counter 242 at the value determined by size selection switches 280. The signal is also sent via wire 273 to the last three stages of counter 190 to reset them to zero. It can also be seen in FIGURE 12 that stage 16 of the counter 190 operates solenoid 134 for window control and stages 32 and 64 operate both solenoids 134 and 135 to move said window by 32 units.

As soon as an end of line or carriage return code is recognized by decoder 180 (FIG. 11), contact 243 operates that causes pulses generated by generator 240 to reach via wire 241, closed contact 243, closed contact 245 and translator 250 the carriage motor 162. However, as shown in the figure, wire 241 is connected to the "reverse" input terminal 248 of the motor control, so that said motor will now return the mirror carriage 158 to its "zero" position ready to project the first character on the tape following the "end of line" codes. Contact 245 is also shown in FIG. 1 where it is evident that the return of the carriage 158 to the right as seen in this figure, will cause contact 245 to open to interrupt the feeding of pulses to the reverse circuit of said motor. The end of line signal also causes contact 266 to close which permits a "start" pulses generated by circuit 238 to reach via wire 239 gate 244 which now opens to let pulses from generator 241 to reach counter 242. However, before this happens, contact 268 has been operated (early in the end of line sequence) as well as contact 274, said contact allowing a "set" pulse appearing on wire 275 to set counter 242 via wire 271, leading selection push button 272, and operated contact 268 to a value equal to its full capacity minus the number of leading units selected. The leading selection unit is similar to the size selection unit of FIG. 14. As pulses are fed into counter 242 they are also fed via wire 247, energized contact 253 and wire 255 to the leading motor 170 through translator 254. Thus, the leading motor is moved by a number of units equal to the number of units it takes to fill counter 242. As described previously, the "carry" pulse appearing on wire 257 at the end of the leading operation causes gate 244 to close. The end of the leading operation is also detected by the carry pulse appearing on wire 269 through end of line contact 301. This pulse is utilized to move the end of line sequential circuit and cause it to reset counter 242 to the value called for by the size selection buttons 280. This is accomplished by releasing relay contact 268 and operating contact 282. This contact 282 resets to zero the width counter 190 at the same time as it resets counter 242 through wire 273. Contact relay 266 is also released by the "end of leading" signal appearing on wire 269. Transfer contact 261 is also released to return to the position shown in FIG. 12 as well as contact 253, controlling the leading motor 170. The leading contacts 266, 268, 301, 261, 274 and 253 are preferably a relay contacts. This relay which is normally operated by the end of line sequential circuit can also be manually operated by a button not shown, so that by pushing button 251 the film can be fed continuously by pulses reaching leading motor 170 through translator 254 and wire 249. This relay is also operated by any "additional leading" codes. If, for example, it is desired to add 8 point between two paragraphs of a text being composed, the operator punches 8 and then a functional shift code. When the tape is run backward through the machine, the functional shift code will operate functional shift relay 186 of FIG. 11 as explained above to transfer the 8 code emerging on wires 167 to wires 187 to energize the leading relay operating the "leading contacts" listed above. The additional leading then takes place and when this is accomplished, the leading relay is released and the tape moves forward to transfer the next code to the machine. A push button 278 (FIG. 12) enables the operator to reset the counter 242 for manual insertion of additional leading between blocks of text matters.

In this preferred embodiment the machine operates cyclically so that for example, a character is projected for each revolution of the matrix drum except when the mirror carriage has to be stepped, in which case, one or more revolutions may have to be lost to allow sufficient time for the mechanical displacement of the carriage to be accomplished. A "stop" code causes relay 283 to operate. This relay locks on a "reset" button 303 as shown. As long as "stop" relay is operated, the normal operation of the machine is interrupted.

The sequence of operations during composition of a line is controlled by cams 146 and 148, FIG. 1. These cams are schematically represented in timing diagram of FIG. 18. It has been assumed in this diagram that the total machine cycle of 360° is divided into half-cycles of 180°. One-half cycle corresponds to the passage of the upper case alphabet opposite the projection window and the other half cycle corresponds to the passage of the lower case alphabet. Two sets of cams are preferably used, as shown in FIG. 18 where a group of cams 294 is utilized for the projection of upper case characters, and a group of cams 295 for the projection of lower case characters. The selection of one group or the other group of cams can be obtained by a "cap shift" relay which transfers a common operating voltage from one group to the other group of cam contacts. The cap shift relay can be operated by the "cap shift" code when it is recognized by the decoder and released by the "cap unshift" code. In each group of cams, similar cams are represented by the same reference numbers which are primed in the case of lower case character cams. Cam 177 closes a circuit during the time shown by the horizontal bars 177. It is used to move the punched paper tape forward. Cam 264 controls the operation of relay 258 of FIG. 12 which controls mirror carriage stepping. Cam 178 causes the column of codes in reading position in the tape reader to be read and transferred to the circuit. Cam 216 closed a circuit for a short time to add one unit between words for justification purposes until the justification remainder has been exhausted. 299 represents approximately the actual mechanical displacement of the punched paper tape; 302 represents approximately the mechanical displacement of the window mechanism whenever it is operated; and 305 represents also approximately the mechanical displacement of the mirror carriage whenever it is stepped.

In the embodiment of the invention which has been described, it has been assumed that characters of different sizes are not mixed in the same line during the composition of the line. It is important, however, to be able to mix sizes automatically in a machine used to produce display composition. The arrangement shown in the FIGS. 15, 16 and 17 make it possible to mix even in the same line characters of different point sizes. This is obtained by rotating lens turret 56 of FIG. 15 to replace lens 154 by another lens of a different focal length, for example as shown in Patent No. 2,999,434. At the same time the circuit which controls the displacement of carriage 58 of FIG. 15 is changed as will be explained later. FIG. 15 is similar to FIG. 1 except for the means used to move the carriage 58. Two racks, 60 and 74, having teeth slanted in opposite ways as shown, are attached to carriage 58. Rack 60 and associated pawl 64 operate in the same manner as in a typewriter escapement. Carriage 58 moves one tooth space of rack 60 for each energization of solenoid 62. The purpose of rack 74 which is engaged by pawl 70 is to prevent back bouncing of the carriage after each displacement. The carriage is continuously urged toward the direction of the arrow by a clock spring 76. To return the carriage at the end of each line, solenoid 72 is operated in order to disengage pawl 70 from the rack 74. The carriage is returned by a motor not shown but which can be motor 162 of FIG. 12.

In the example illustrated by block diagram of FIG. 16, the escapement shown in FIG. 15 can be utilized as that system does not require the carriage 58 to move by any other value but one or an integral number of predetermined steps. Such step can correspond to 48 units of 6-point characters which is close to 6 millimeters, or to 256 elementary width units as defined later or approximately 5 millimeters. Of course, although said carriage is moving a fixed constant distant for each energization of solenoid 62, it should be understood that in certain cases, particularly for production of larger point size type said solenoid 62 may be operated more than once for each necessary displacement of carriage 58. Turning back now to FIG. 16, it is assumed that storage 2 represents in coded form not only the necessary information as to character identity but also additional codes as to actual character width. The storage could be a punched paper tape or a magnetic tape or a mechanical storage as described in our Patent No. 2,690,249 or a storage of the kind shown in Patent 3,049,210. Character width codes do not have to be in said storage and they could be generated as in the previously described embodiment through style cards or equivalent means. The embodiment of FIG. 16 it is assumed that the character width is not represented in relative units, but in absolute units representing actual character widths. These absolute units will be referred to as EWU for Elementary Width Units.

The circuit of FIG. 16 includes multiplying means as described in Patent No. 2,876,687 so that characters of different point sets (or sizes) may be mixed in the same line. Eight binary stages are utilized for the representation of each character width so that the maximum width represented by a set of 8 pins or bits (mechanical or electronic storage) or 8 holes (punched tape) is 255 EWU. By making one unit equal to one-eighteenth of one em in one-point set (or size), it is thus possible to store individual character widths large enough to accommodate 14 point characters (a 14-point em requires 252 EWU).

The adder 4 (FIG. 16) receives from storage 2, preferably in binary code form, digital values corresponding to each character of the line to compose. The character width is transferred from storage to adder 4 via wires 6 and justification increments via wires 8. In one embodiment of the invention, the maximum capacity of adder 4 is 255 EWU. The "overflow" or carry over of the counter results in a pulse transferred via wire 10 to the rack escapement mechanism of carriage 58, FIG. 15.

The characters are projected one by one onto film 84 by cyclically operating the reading out section of storage 2. This storage is stepped one position following the projection of each character is in the previously described embodiment. As soon as a new character is decoded, its width is transferred to adder 4 and to multiplier 16, where said width is multiplied by a factor proportional to the point size of the master characters of the matrix. In the present embodiment in which 6-point characters are on the matrix, factor would be 6. The resulting figure is now divided in block 18 by a factor proportional to the point set or size of the particular character to be projected, as determined by box 38 controlled either by point set codes of storage 2 or by lens turret circuit 36. The quotient of this division is transferred to storage 20, connected to comparison circuit 22. The matrix 42, shown in the form of a continuously rotating disc is provided with characters and controlling slits as described in Patent No. 2,775,172 rather than with magnetic pulse generating means. Slits 46 generate photoelectric pulses as described in said patent. These pulses are accumulated in counter 32, and when the count corresponds to the code of the character to project, a pulse appears on wire 33 to open gate 26. The pulse generating slits are so positioned in relation with each master character that counter 32 generates a pulse at the precise instant when the right hand reference line of the character selected intersects the early reference line as defined previously. A pulse generator 28, synchronized with matrix shaft 86 generates pulses at a frequency determined by the matrix speed and the point size of matrix characters. The pulses produced by generator 32 go through gate 26 as soon as it opens and reach counter 24 where their sum is continuously compared to the sum in storage 20 which corresponds to the width of the character to be flashed as in the previous embodiment. As soon as the values stored in storage 20 and counter 24 are equal, a pulse is generated by comparison circuit 22 and transferred via wire 27 to flash control circuit 30 to trigger flash lamp circuit 44 and project the image of said character onto the film. The image is thus projected so that the left hand edge of the character is flush with the left hand margin of the page (if this is the first character of the line). The projection of the next character will be delayed more if adder 4 has increased in value, or less if said counter has decreased in value after transfer of a carry to escapement 12.

In order to illustrate the preceding description let us suppose that the word "the" is to be composed at the beginning of a line, in 10 point, Bodoni roman. In this style, the relative widths in relative units or fractions of an em, of the selected characters are as follows: t=7, h=10; e=8. In 10 points, their real value in EWU (or one-eighteenth of one point) will be 10 times greater or t=70; h=100; e=80. These values may be in the storage in binary forms, associated with each character identity code or may be generated by the machine circuit. Before the first character is flashed, its value is entered into adder 4 which was "clear" so that it now registers 70 units. Assuming that six-point characters are on the matrix, the value stored in block 16 will be 6 times 70 or 420 EWU. This value is going to be divided by the selected point size (10 point) in block 18 which will thus send 420 divided by 10 or 42 EWU to storage 20. As soon as the vertical reference line of character "t" reaches the "early" reference line of the machine as described in relation with the first embodiment and FIGURE 8, gate 26 opens and pulses are sent by generator 28 to counter 24. The time elapsed between each pulse is such that one EWU space is travelled by the characters of the disc or drum during this time. After character "t" has travelled 42 EWU from the "start count" position as defined above, comparison circuit 22 triggers the flash and "t" is projected. Its image falls on the film at a distance from the left hand margin of the text column equal to 42 times enlargement ratio (or 42 multiplied by 10) divided by 6, which equals 70 EWU which is exactly the amount of space required by the letter "t." The next letter "h" brings the count of adder 4 to 70 plus 100 or 170 EWU and the operation proceeds as described above. The next character "e" will be projected when this count is reached by counter 24. The next charcter could be a space, for example, 6 units wide or 60 EWU. It will cause adder 4 to overflow and return to 250 plus 60 minus 256 or 54 EWU. The carry over will cause escapement 12 to operate in order to move the carriage 58 by 256 EWU or 5 millimeters in order to properly space the following character.

Although it has been assumed that characters are first spaced and then flashed, it is possible to operate differently, for example by aligning characters on the disc so that when the first character is flashed with zero in adder 4 its left hand margin is flush with the left hand margin of the column. The result is simply obtained by properly positioning the pulse generating slits of the disc in relation with associated characters.

For large point sizes the capacity of adder 4 is increased so that it may receive larger character width values. In this case the carry pulse could cause escapement 12 to operate more than once between two character projections.

Block diagram of FIG. 17 represents an embodiment where although characters are stored in relative width only, it is possible to automatically mix different point sizes. In the example shown the image displacement for various sizes is automatically compensated for, but the "carry" signal emerging from adder 106 varies in absolute value according to selected point size. Relative widths are directly transferred from adder 106 to comparison circuit 116. The pulses generated by block 29 are spaced so that a character of matrix 42 travels one relative unit between two consecutive pulses, as in the first embodiment of the invention. Thus, in this embodiment the frequency of generator 29 is one-sixth of the frequency of generator 28 of the previous embodiment of FIGURE 16 because the size of the master characters is 6 point. For example, a 6 point "M" will be flashed, at the beginning of a line, after it has travelled 18 relative units and an 18 point "M" will also be flashed at the same instant. The presence of different magnifying lenses for 6 point and 18 point will cause the 18-point image to be deflected three times more than the 6-point image thus automatically compensating, through lens "leverage" for a wider character. This embodiment, however, necessitates a variable escapement 110 to control the displacements of the reflecting prism assembly 14, as it is necessary to multiply the output or carry of adder 106 by a factor determined by the point set or size.

It is also possible to combine the first and second embodiment in a system which will have the simplicity of the second embodiment in automatic correction of spacing according to point size without necessitating and elaborate variable escapement. This can be achieved, for example, by moving the projection lens such as 120 (FIG. 3) in a plane parallel to the film and along a line parallel to the line to compose by fixed amounts each time a carry pulse emerges from adder 106. In this case, of course, the moving lens-prism assembly is not used, large image displacements being directly obtained by the lens which could be a variable focal length lens commercially known as "Zoom." In this latter arrangement, no multiplier or divider is necessary as image enlargement and image displacement are changed by optical means only.

The operation of the machine can be summed up as follows:

Machine is turned on, tape is inserted and "start" button is pushed, tape moves step-by-step.

"Carriage return" code is read and decoded. Sequential circuit 220 is triggered from position 0 to position 1 and operates as follows:

In position 1

Mirror carriage return to zero is initiated (ready for new line) by opertaing contact 243.

Leading sequence starts (stage one).

A transfer relay, not shown, part of reader circuit (box 176, FIGS. 10 and 11) is operated to transfer the output of reader from decoder 180 to sequential circuit over wires 165 (FIG. 10).

Tape moves one step under tape feed cam control.

Position 2

Stage two of leading sequence takes place.

Tape code following CR code is read and transferred via wires 165 and internal switching circuit of 220 to justifying space storage 222.

Tape is moved one step.

Position 3

Tape code is read and transferred via wires 165 and internal switching circuit of box 220 to first six stages of deficit counter 212.

Tape is moved one step.

Position 4

Tape code is read and transferred via same wires 16 and through internal switching circuit of box 220 to the last stages of deficit counter 212.

Sequential circuit waits for the following signals to have been received (through "AND" circuits): justification computation is complete.

Carriage is returned at zero.

Leading has taken place to move to position 5.

Position 5

Tape control is returned to cam unit.

Tape is moved one step to read last character in the line (first to be read for "reversed" composition).

Sequential circuit returns to zero.

The sequential circuit 220 could include a stepping switch as described in Patent 2,682,814 or equivalent electromechanical or electronic means.

The leading sequence can operate as follows:

Stage 1

Position 1 of sequential circuit 220 operates contacts 268 and 274, FIG. 12, to preset counter 242 to the leading value and shifts contact 253.

Stage 2

Position 2 of sequential circuit 220 closes contact 266 and contact 301.

Stage 3

A signal appears on wire 269 to inform sequential circuit 220 that leading is complete.

Stage 4

When sequential circuit 220 returns to zero, contacts 266, 301, 253 and 261 are returned to rest position until next leading operation which could be caused by manual intervention or through an "additional leading" code. Such a code may cause a sequential circuit to operate to move the leading sequence through stages one to four. In this case, however, the counter 242 is preset at the value determined by the "additional leading" codes of wires 187 fed to counter 242 through an input contact not shown.

Following a normal end-of-line sequence, the projection of a line proceeds rapidly until the next carriage return code with no mechanical start-stop operation to slow down the machine except when the mirror carriage has to be moved one step.

When a "cap shift" or "unshift" code is read a half-turn of the matrix is lost as the control of the machine is transferred from one group of cams to the other (FIG. 18). Whenever a "level shift" is read, which causes shutter 323 of FIG. 23 to operate, no machine cycle is lost except the one during which the "level shift" code is read. When a "matrix shift" code is read, lens lever 340 (FIG. 24) is moved from one position to the other and one machine cycle in addition to the one where the shift code is read may be lost because of the inertia of the lens-shift mechanism. Contact means, not shown, can be associated with arm 340 to prevent the normal operation of the machine to take place until projection 341 is firmly sitting on one of stops 336–337.

If a kill-line code is read, a relay (not shown) prevents normal end of line sequence operation as explained in co-pending Canadian Patent No. 676,050.

According to an important feature of the present invention, it is possible to dispense entirely with the mirror or prism carriage shown at 58 in FIG. 15 and at 158 in FIG. 1. The preferred embodiment of the invention in which no such carriage is used is schematically shown in FIGS. 19, 20, 21 and 22. The arrangement shown in these figures makes it possible to achieve considerably higher composition speeds as no relatively heavy parts have to be displaced during the composition of a line of text. The mirror carriage of FIGS. 1 and 15 may weigh as much as two pounds as the "shutter" to periodically move in the embodiment which is presently being described weighs a few ounces. The purpose of the mirror carriage 158 in FIG. 1 is to move the optical axis of the machine to fresh areas of the film each time the image displacement obtainable byselective flash timing is used up. In FIG. 19 the matrix drum is shown at 88, the film matrix at 100, and the window at 132. The drum continuously rotates in the direction shown by the arrow and the distance d is the same as shown in FIG. 8. Each represents the fraction of a revolution of the matrix drum during which a character may be flashed. By inserting a pair of flat reflecting surfaces such as mirrors 306 and 307, between lens 164 and matrix 100, the drum area of width d is projected to different locations of film 84 through multiple reflections inside the mirror sandwich. The width of areas d projected on the film depends on the magnification ratio of lens 154 and of mirror spacing. These areas of width l are shown in FIG. 21 at 320. In the example shown, it is assumed that the length of line desired can be covered by no more than 13 areas represented in FIGS. 19 and 21 by reference 320–1, 320–2 . . . 320–7 . . . 320–13. Returning now to FIG. 19 it can be seen that area 320–7 which is the image of area of width d on the matrix is projected directly through the lens 154. Area 320–6, image of the same film matrix area is projected as shown after one reflection on mirror 307. Area 320 which is removed 6 steps from optical line xx'' equidistant from the pair of reflecting surfaces is obtained after the "object area" image of the matrix has bounced six times between mirrors 306 and 307 as shown. If, at the time the flash occurs to project a character such as "M," this character is just located at the early flash position, as defined before, an image of the iluminated character would be formed in each one of the incremental image areas 320 as shown in FIG. 21. As the "M" matrix character moves towards the "late" flash position, the multiple images made in the plane of the film move towards the "M" position shown in dotted lines which represent the image location at the time the character is at the "late" flash limit. These "projection areas" are utilized one after the other to replace the mirror carriage of FIGS. 1 and 15. In order to limit the exposure to one character only on the film, a shutter band 308 is positioned between film 84 and lens 154 as close as practically possible to film 84 to avoid parallax problems. Shutter band 308 could be a flexible steel strip provided with an aperture 317 (FIG. 22), the purpose of which is to allow no more than one character at a time to reach one of the discrete areas of the film. The steel band shutter 308 can be stepped in the same manner as the mirror carriage 158 is stepped in the first embodiments of the invention. The shutter band can be provided with sprocket holes 309, FIG. 22, engaged by a sprocket roller 310 attached to shaft 311 driven by stepping motor 318.

The shutter can make a closed loop as shown by placing idler roller guides 312, 313 and 314 at proper locations on the frame of the machine. To avoid interfering with the light bundles emerging from lens 154 the rear section of shutter band 308 is preferably of a narrower width as shown in FIG. 22 at 368. The wider section of said band which moves adjacent to film 84 can be provided with an aperture 315 wide enough to accommodate any point size which can be obtained by the machine. An inserted thin clip 316 provided with a window [137] *317* corresponding to the lens being used can be attached to band 308 to accommodate the point size for which the machine has been set up. Whenever the point size is changed by changing lens 154, clip 316 is replaced by another one having an aperture corresponding to the maximum width of a character in the new size desired. The stepping of motor 318 is also changed for example, by using the circuit of FIG. 12. Instead of a shutter band other shutter means can be utilized such as a multiple blade arrangement operating in parallel as is well known in the art.

The matrix drum is preferably provided with more than one font, and font shift means which do not require a displacement of the matrix font are shown in FIGS. 23 and 24. The drum 88 is provided with two groups of sprockets to hold two distinct groups of matrix film strips. Each matrix film strip is long enough to accommodate, for example, 90 characters, but each can be made up of segments as described earlier. Film strips can be individually changed to make it possible to mix various type faces for different composition jobs. Two complete different film strips are shown in FIG. 23 at 100 and 113. Each complete strip is provided, in the example shown, with two rows of 90 characters each shown at 326 and 327 for strip 100 and at 328 and 329 for strip 113. Font 326 can be a Roman book face, font 327 and corresponding italic face, row 328 can be a bold sanserif face and font 329 can be in the corresponding italic face. All of these fonts are simultaneously illuminated by the flash lamp in the projection window area each time it is flashed, preferably through a condensing system (not shown). A shutter 322, operated by a solenoid not shown, makes it possible to select either the upper strip film 100 that is font 326 and 327 or the lower film strip 113 that is font 323 and 329. A second shutter 323 also operated by a solenoid not represented is used to select the upper or lower level of each strip such as 326 or 327 and 328 or 329. Well known optical merging means are utilized to project along the same line 342 any character of font 327 or font 329. Said ptical merging system includes front surface mirrors 330, 31 and 333 and beam-splitting mirror 332. In the posi-on of the system shown in FIG. 23 it is font 327 which as been selected by the selective positioning of shutters 22 and 323. Character belonging to this font are pro-ected through lens 154 along optical axis 342 to lens 57 of ie mirror carriage of the machine. When it is desired ) project one of the upper level fonts 326 or 328, shutter 23 is energized in order to let light emerging from these ints to go through and hit the mirror assembly. In this ase as shown in the figure, projected character images ill follow the dotted lines and merge on line 343 paral-l to line 342. In order to project these characters on ie film at the proper position, the point size lens 154 shifted from position 154 to position 154'' (FIG. 24). y a distance equal to distance h separating an upper level ow from a lower level row of matrix characters. The ptical system is such that this operation does not effect ie location of the character image on the film, that is, a character belonging to row 327 is projected and a ke character on row 327 is also projected after having ioved shutter 323 and lens 154, both images will exactly iperimpose on the film assuming said characters width not taken into account. This result is obtained because ns 154 is located at an optical distance from drum 88 qual to its focal length so that light rays emerging from ns 154 are collimated as explained in Patent No. 2,670,-65. These collimated rays are focused on the focal plane f lens 57 which is located on the film plane as explained i said patent. Means to shift lens 154 from one posi-on to the other are shown in FIG. 24. Lens 154 is iounted on a rocking arm 340 pivoted at 344 on the ame of machine. The arm is provided with an extension 41, which sits on a fixed stop 337 as it is pulled by ring 338. Energization of solenoid 334 pulls lever 340 irough spring-link 335 to bring extension 341 in contact ith the fixed upper stop 336. Stops 336 and 337 are ccurately located so that the distance moved by the enter of lens 154 is equal to the distance separating two onsecutive rows of characters on a film strip of the iatrix whenever said lens position is changed.

The embodiments described herein can be modified r equivalent means can be used without departing from ie scope of the present invention. For example, analog ither than digital means can be utilized to vary the flash ming. These may include delay lines and the like. It is lso possible to vary the frequency of pulse generator 28 r 29 (FIGURES 16 and 17) to accommodate various oint sizes, rather than dividing the absolute character idth by a factor depending on the point size.

We claim:

1. In photocomposing apparatus, the combination of a iaracter carrier bearing the characters to be projected, sensitized sheet optical means including an aperture to roject the image of a selected character upon the sheet, ieans for holding said sensitized sheet stationary during ie composition of at least a portion of a line, intermittent ash means to illuminate the selected character at a ioment while it appears in the aperture, mechanism for iusing the character to move within the aperture and its nage to move in relation to the sheet continuously in the irection of a line of composition, mechanism for inter-iittently moving the imaging area on the sheet in rela-on to the aperture, said intermittent movement occuring ter the projection of more than one character and a ontrol device for the flash means to vary the moment f flash to permit the character to be illuminated in any ie of a plurality of positions in the aperture.

2. In photocomposing apparatus, the combination of a iaracter carrier bearing the characters to be projected, a nsitized sheet, means for holding said sensitized sheet ationary during the composition of at least a portion of line, optical means including a number of selectable ns of varying magnification and an aperture to project ie image of a selected character upon the sheet, intermittent flash means to illuminate the character while it appears in the aperture, mechanism for causing the character to move within the aperture and its image to move in relation to the sheet continuously in the direction of a line of composition, mechanism for intermittently moving the imaging area on the sheet in relation to the aperture, said mechanism controlled by the magnification of the lens and the accumulated width of the previously flashed characters, and a control device for the flash means controlled by the accumulated widths of the previously selected characters and varying the moment of flash to permit the character to be illuminated at any one of a plurality of positions within the aperture.

3. Apparatus according to claim 1 wherein control means are associated with the character carrier, one for each character precisely spaced relatively thereto, said control means effective to produce an electrical impulse when the character is at a predetermined location in the aperture.

4. Apparatus according to claim 1 wherein the character carrier has associated therewith means producing a delay initating signal when a selected character is at a predetermined location in the aperture and also including a pulse generator synchronized with the movement of the character and counter means for the pulses enabled by the delay initiating signal to count the pulses and to operate the flash means after a predetermined number of pulses.

5. Apparatus according to claim 1, including means to produce a delay initiating signal when a selected character is at a predetermined location in the aperture and a delay device for producing a variable delay controlled by the width of said character, together with the accumulated widths of any characters previously projected, said delay being initiated by the delay initiating signal and terminating with an impulse to operate the flash means, and a connection from the delay device to the mechanism for intermittently moving the image position on the sheet when the delay reaches a predetermined magnitude.

6. In a photocomposing apparatus, the combination of a continuously rotating character carrier upon which characters to be projected are located at uniform distances from the axis of rotation, means to select a character to be photographed, means to produce a location code corresponding to a selected character, a sensitized sheet, means for holding said sensitized sheet stationary during the composition of at least a portion of a line, optical means including an aperture to project the image of the character upon the sheet, intermittent flash means to illuminate the character during the time when it appears in the aperture, characters located on the character carrier being arranged to move seriatim so as to cause their images to move on the sheet in the direction of a line of composition, mechanism for intermittently moving the imaging area on the sheet in relation to the aperture, said intermittent movement occurring after the projection of more than one character and control device for the flash means under control of the location code to vary the movement of flash to permit the character to be illuminated at a selected one of a plurality of positions within the aperture.

7. Apparatus according to claim 6, where the mechanism for intermittently moving the imaging area on the sheet in relation to the aperture is an equal spacing mechanism.

8. Apparatus according to claim 6, including a register to store the information selected by the character selection means and to operate the mechanism and the control device.

9. Apparatus according to claim 6 including a register to store the information selected by the character selection means and to operate the mechanism and the control device, and a justifier controlled by the register and operatively associated with the flash control device for selective insertion of justifying spaces in a line of projected character.

10. The combination according to claim 6 wherein the control device includes a first digital counter, means to advance the counter by a count corresponding to the width of a selected character, a pulse generator synchronized with the movement of the character, a second counter adapted to count the impulses from the pulse generator following the moment when the character is at a reference position in the aperture, and comparing means to operate the flash means when the first and second counts correspond.

11. In a photocomposing apparatus, the combination of a continuously rotating drum, characters associated with said drum and rotating therewith, location indicating means associated with each character, a photo sensitive surface, means for holding said photosensitive surface stationary during the projection of at least a portion of a line of composition, intermittent flash means for illuminating said characters, optical means to project said characters upon the photosensitive surface seriatum in the direction of a line of composition, an aperture through which the characters move, control means associtaed with the character location indicating means effective to indicate the position of each character with respect to the aperture, pulse generating means synchronized with the rotation of the character drum, flash enabling means effect to illuminate a character at a selected one of a plurality of projection positions within the aperture where its image will be projected on the photosensitive sheet in spaced relation to previously photographed characters, said flash enabling means being responsive to the control means associated with the character locating means and the pulse generating means.

12. In a photographic composing apparatus the combination of a light source capable of producing a flash of light of short duration, characters to be photographed, an aperture large enough to allow the projection of a plurality of characters when the light source is flashed, means to move said characters in turn past the aperture, a detection means effective to indicate the presence of the desired character within the aperture, a window movable in relation to the aperture effective to mask all characters in the aperture except a selected one; a light sensitive surface upon which the selected character may be imaged, means for holding said light sensitive surface stationary during the composition of at least a portion of a line, an optical ssytem effective to image the projected character upon the light sensitive surface, flash initiation means effective to actuate the light source at the moment when the character is at a selected one of a plurality of positions within the aperture.

13. In a photographic composing apparatus the combination of a rotating character carrying drum, a first lens effective to project the image of a character on the drum and spaced from the drum at approximately its focal length, an aperture defining a character projection area bounded by a first flash position and a last flash position said first flash position being the position where a character may be first projected by the said first lens and the last flash position representing the last position where a character may be projected by said lens, a second lens spaced from the first and effective to form an image of the character at its focal plane, an optical deflecting element effective to deflect the light emerging from the second element normal to the optical axis, a carriage movable parallel to the optical axis adapted to hold the second lens and deflecting element in fixed relationship, a light sensitive material located in the focal plane of the second lens and effective to receive the projected image of a character on the drum, a light source to illuminate all characters within the aperture, a window adapted to be variably positioned within the aperture effective to mask all characters in the aperture except the one selected for projection, control means adapted to actuate the light source when a selected character is positioned within the aperture such that its image will fall upon the light sensitive material in a precise spaced relationship to the characters previously projected thereon, said control means also adapted to position the window and carriage whereby as selected characters are projected progressively across the aperture from the said first to the last flash positions the window is moved accordingly and the carriage is moved a fixed distance when the next character to be flashed does not fall within the aperture.

14. The method of spacing photographed chaarcters in a line in proportion to their widths comprising the steps of rotating the characters around a fixed axis and through a projection area, assigning a width value in units which is proportional to the physical width of the character, photographing the first desired character at a first position in the projection area, photographing the second character at a second position in the projection area, photographing the third character at a third position in the projection area, said first, second and third positions being spaced from each other by a distance proportional to the width values of each character and intermittently displacing the imaging area relative to the projection area.

15. The method of photographically composing a line of alphanumeric characters comprising the following steps: reading a character code, loading the character code into a storage decoder, decoding the width for the character and adding it to a width accumulator, incrementing a character identity counter one step for the passage of each character past a first flash position, detecting the coincidence between the value in the storage decoder and the character identity counter which indicates that the selected character is passing the first flash reference position, when coincidence is detected, counting pulses corresponding to width units of the character and photographing the character when the number of pulses counted corresponds to the value in the width accumulator, repeating the same procedure with each succeeding character until the capacity of the width accumulator is equalled or exceeded at which time the width accumulator resets with the remainder being retained in the accumulator, controlling the photographic apparatus so that each time the width accumulator is reset the area on the film being exposed is shifted in the direction of the line of composition by a distance directly related to the point size of the characters being projected.

*16. In photocomposing apparatus, the combination of a character-carrier bearing the characters to be projected, a sensitized sheet, means for holding said sensitized sheet stationary during the composition of at least a portion of a line, flash means to illuminate a selected character at a moment while it appears in a character projection area, optical means for projecting the image of said selected character upon the sheet, a mechanism for causing the character to move within said character projection area and its image to move in relation to the sheet continuously in the direction of a line of composition, and means for spacing said character images on said sheet in accordance with their respective widths in order to form a line of composition thereon, said spacing means comprising in combination:*

*electornic means for varying the moment of flash to permit a selected character to be illuminated in any one of a plurality of positions within the character projection area, and*

*optical-mechanical means associated therewith for moving the imaging area on the sheet in relation to said character projection area.*

*17. The apparatus of claim 16 in which said electronic means comprises a flash delay control circuit, and said optical-mechanical means comprises a movable carriage having character image beam-deflection means mounted thereon.*

*18. In photocomposing apparatus, the combination of a character-carrier bearing the characters to be projected, a sensitized sheet, means for holding said sensitized sheet*

*tationary during the composition of at least a portion f a line, flash means to illuminate a selected character t a moment while it appears in a character projection rea, optical means for projecting the image of said se-ected character upon the sheet, a mechanism for causing he character to move within said character projection rea and its image to move in relation to the sheet con-inuously in the direction of a line of composition, and reans for spacing said character images on said sheet in ccordance with their respective widths in order to form line of composition thereon, said spacing means com-rising in combination:*

*fine spacing means for flashing a selected character in any one of a plurality of positions within said character projection area, and*

*coarse spacing means associated therewith for moving the imaging area on said sheet relative to said character projection area.*

*19. The apparatus of claim 18 in which:*

*said fine spacing means comprises an electronic flash delay circuit, and*

*said coarse spacing means comprises a movable carriage having character image beam-deflection means mounted thereon.*

*20. In photocomposing apparatus having a movable haracter-carrier bearing master characters to be pro-ected, a sensitized surface, a support for said surface, and ptical means for changing the size of character-images rojected from said carrier to said surface:*

*storage means for storing coded values representative of characters to be composed, said values representing actual character widths,*

*multiplier means for multiplying the width of a character to be projected by a factor proportional to the point size of said master characters on said carrier,*

*divider means for dividing said multiplication by a factor proportional to the point size of a particular character to be projected, and*

*means for comparing the result of said division to a value representative of the instantaneous position of the movable character-carrier with respect to a reference signal, said comparison means adapted to generate a signal when coincidence occurs between said division and the representation of the instantaneous position of said carrier, such that the generation of said pulse energizes a control circuit for projecting the image of said character onto said sheet, whereby characters of different point size may be mixed in a single line of composition.*

References Cited

The following references, cited by the Examiner, are of record in the patented file of this patent or the original patent.

UNITED STATES PATENTS

| | | | |
|---|---|---|---|
| 1,893,439 | 1/1933 | Ogden | 95—4.5 |
| 2,714,842 | 8/1955 | Hoover | 95—4.5 |
| 2,781,706 | 2/1957 | Higonnet | 95—4.5 |
| 3,006,259 | 10/1961 | Blakely | 95—4.5 |
| 3,220,641 | 11/1965 | Stark | 234—1 |

JOHN M. HORAN, Primary Examiner